United States Patent
Gao et al.

(10) Patent No.: US 11,863,829 B2
(45) Date of Patent: Jan. 2, 2024

(54) DISPLAY APPARATUS AND METHOD FOR DISPLAYING IMAGE RECOGNITION RESULT

(71) Applicant: JUHAOKAN TECHNOLOGY CO., LTD., Shandong (CN)

(72) Inventors: Sitai Gao, Shandong (CN); Jie Han, Shandong (CN); Guangqiang Wang, Shandong (CN); Yansong Fu, Shandong (CN)

(73) Assignee: JUHAOKAN TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/849,640

(22) Filed: Jun. 25, 2022

(65) Prior Publication Data

US 2022/0329908 A1    Oct. 13, 2022

Related U.S. Application Data

(63) Continuation of application No. PCT/CN2021/094553, filed on May 19, 2021.

(30) Foreign Application Priority Data

May 25, 2020 (CN) .......................... 202010448764.2
Sep. 30, 2020 (CN) .......................... 202011060304.9
(Continued)

(51) Int. Cl.
*H04N 21/4722* (2011.01)
*H04N 21/422* (2011.01)
(Continued)

(52) U.S. Cl.
CPC ... *H04N 21/4722* (2013.01); *H04N 21/42206* (2013.01); *H04N 21/4316* (2013.01);
(Continued)

(58) Field of Classification Search
CPC ......... H04N 21/4722; H04N 21/42206; H04N 21/4316; H04N 21/44008;
(Continued)

(56) References Cited

U.S. PATENT DOCUMENTS 7,266,224 B2    9/2007  Sukegawa
10,395,120 B2   8/2019  Chen
(Continued)

FOREIGN PATENT DOCUMENTS

CN    1494037 A    5/2004
CN    1703694 A    11/2005
(Continued)

OTHER PUBLICATIONS

First Chinese Office Action regarding Application No. 202011110556.8 dated Aug. 12, 2022. English translation provided by Chinable IP.
(Continued)

*Primary Examiner* — Farzana Hossain
(74) *Attorney, Agent, or Firm* — ANOVA LAW GROUP, PLLC

(57) ABSTRACT

A display apparatus, including: a display configured to display a video; a user input interface configured to receive a command; a remote control comprising a plurality of buttons; a controller in connection with the display, the user input interface and configured to: receive a command for obtaining information associated with one or more character objects in the video currently displayed on the display of the display apparatus, wherein the video is displayed in a video play window in the video layer; in response to the command, cut a target image in the video play window, to recognize an object in the target image; continue playing the video in the video play window in the video layer, and display a character name of a first character object recognized from the target image in a first layer over the video layer.

18 Claims, 23 Drawing Sheets

(30) Foreign Application Priority Data

Oct. 15, 2020 (CN) .......................... 202011104522.8
Oct. 15, 2020 (CN) .......................... 202011104623.5
Oct. 16, 2020 (CN) .......................... 202011110556.8

(51) Int. Cl.
*H04N 21/431* (2011.01)
*H04N 21/44* (2011.01)
*H04N 21/478* (2011.01)
*H04N 21/81* (2011.01)

(52) U.S. Cl.
CPC . *H04N 21/44008* (2013.01); *H04N 21/47815* (2013.01); *H04N 21/8133* (2013.01)

(58) Field of Classification Search
CPC ......... H04N 21/47815; H04N 21/8133; G06V 10/761; G06V 20/46; G06V 40/172
See application file for complete search history.

(56) References Cited

U.S. PATENT DOCUMENTS

| | | | |
|---|---|---|---|
| 11,074,436 | B1 | 7/2021 | Gu |
| 11,102,441 | B2 | 8/2021 | Fu et al. |
| 2003/0107592 | A1 | 6/2003 | Li et al. |
| 2004/0086157 | A1 | 5/2004 | Sukegawa |
| 2009/0059027 | A1 | 3/2009 | Iwamoto |
| 2017/0255830 | A1 | 9/2017 | Chen |
| 2020/0275048 | A1 | 8/2020 | Fu et al. |
| 2021/0248356 | A1 | 8/2021 | Gu |
| 2021/0264136 | A1 | 8/2021 | Wang et al. |
| 2021/0314668 | A1* | 10/2021 | Fu ...................... H04N 21/4223 |
| 2021/0352239 | A1 | 11/2021 | Fu et al. |

FOREIGN PATENT DOCUMENTS

| | | | |
|---|---|---|---|
| CN | 102063616 | A | 5/2011 |
| CN | 102521619 | A | 6/2012 |
| CN | 104574156 | A | 4/2015 |
| CN | 105373938 | A | 3/2016 |
| CN | 106991448 | A | 7/2017 |
| CN | 107105340 | A | 8/2017 |
| CN | 107832662 | A | 3/2018 |
| CN | 108040125 | A | 5/2018 |
| CN | 108176049 | A | 6/2018 |
| CN | 108259973 | A | 7/2018 |
| CN | 108322806 | A | 7/2018 |
| CN | 108461129 | A | 8/2018 |
| CN | 108573268 | A | 9/2018 |
| CN | 109168069 | A * | 1/2019 ......... G06K 9/00221 |
| CN | 109189289 | A | 1/2019 |
| CN | 109389169 | A | 2/2019 |
| CN | 109858371 | A | 6/2019 |
| CN | 109922363 | A | 6/2019 |
| CN | 109993125 | A | 7/2019 |
| CN | 110245559 | A | 9/2019 |
| CN | 111460180 | A | 7/2020 |
| EP | 2808805 | A1 | 12/2014 |
| JP | H1021326 | A | 1/1998 |
| JP | 2019160329 | A | 9/2019 |

OTHER PUBLICATIONS

First Chinese Office Action regarding Application No. 202011104623.5 dated Aug. 3, 2022. English translation provided by Chinable IP.
First Chinese Office Action regarding Application No. 202011104522.8 dated Aug. 3, 2022. English translation provided by Chinable IP.
Search Report from Notification on Grant of Patent Right for Invention of the corresponding Chinese patent application No. 202011104522.8, dated May 26, 2023.
Search Report from the corresponding Chinese Patent Application No. 202011104623.5, dated May 31, 2023.
Second Office Action from the corresponding Chinese Patent Application No. 202011104623.5, dated May 31, 2023.

* cited by examiner

DISPLAY APPARATUS AND METHOD FOR DISPLAYING IMAGE RECOGNITION RESULT

This application is a continuation application of PCT/CN2021/094553 which claims priority to Chinese Application No. 202011060304.9, filed on Sep. 30, 2020, No. 202011104623.5, filed on Oct. 15, 2020, No. 202011104522.8, filed on Oct. 15, 2020, No. 202010448764.2, filed on May 25, 2020, and No. 202011110556.8, filed on Oct. 16, 2020, which are incorporated herein by reference in their entireties.

FIELD OF THE INVENTION

The present disclosure relates to display apparatus, and in particular, to a display apparatus and a method for displaying image recognition result.

BACKGROUND OF THE INVENTION

A display apparatus, such as a smart television, may provide a user with images such as audio, videos, and pictures. Compared with a conventional television that provides a user with live television programs through broadcasting, a smart television generally focuses more on online interactive media, Internet television, and on-demand streaming media, which can provide a user with more diversified contents and services, for example, various applications and service such as online videos and online games.

Therefore, to improve user experience of a smart television product, there is a need to provide a user with richer information contents through a user interface.

SUMMARY OF THE INVENTION

The present disclosure provides a display apparatus, including: a display configured to display a video; a user input interface configured to receive a command; a remote control comprising a plurality of buttons; a controller in connection with the display, the user input interface and configured to: receive a command for obtaining information associated with one or more character objects in the video currently displayed on the display of the display apparatus, wherein the video is displayed in a video play window in the video layer; in response to the command, cut a target image in the video play window, to recognize an object in the target image; and continue playing the video in the video play window in the video layer, and display a character name of a first character object recognized from the target image in a first layer over the video layer.

The present disclosure provides method for displaying an image recognition result, including: displaying a video on a display, wherein the video is displayed in a video play window in a video layer; receiving a command from a user input interface for obtaining information associated with one or more character objects in the video currently displayed on the display; in response to the command, cutting a target image in the video play window, to recognize an object in the target image; and continuing playing the video in the video play window in the video layer, and displaying a character name of a first character object recognized from the target image in a first layer over the video layer.

DETAILED DESCRIPTION OF THE EMBODIMENTS

Embodiments are described hereinafter in detail, and examples thereof are shown in the accompanying drawings. In description of drawings, unless otherwise stated, same numerals in different accompanying drawings indicate same or similar elements. Embodiments described in the following embodiments do not represent all embodiments consistent with the present disclosure. Merely examples of systems and methods that are described in detail in the claims and in accordance with some aspects of the present disclosure are provided.

Figure 1:
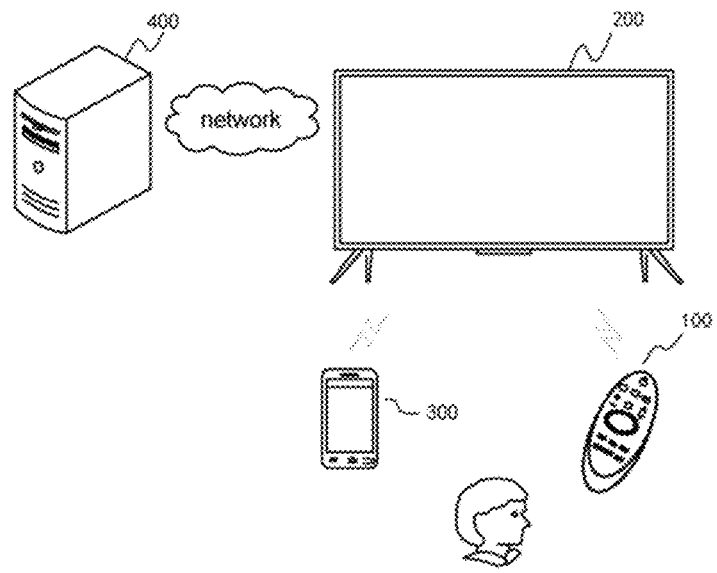
FIG. 1 is a schematic diagram of a scenario between a display apparatus and a control device according to some embodiments of the present disclosure.

FIG. 1 shows a schematic diagram of a scenario between a display apparatus and a control device according to an embodiment. As shown in FIG. 1, a display apparatus 200 may be operated by a user via a mobile terminal 300 and a control device 100.

In some embodiments, the control device 100 can be a remote control. Communications between the remote control and the display apparatus include infrared protocol communication or Bluetooth protocol communication, and other short-distance communications; the display apparatus 200 can be controlled in a wireless way or in other wired ways. The user can control the display apparatus 200 by inputting a user command via buttons on the remote control, voice input, and control panel input. For example, the user can input corresponding control commands by using a volume up/down button, a channel control button, buttons for upward/downward/leftward/rightward movements, a voice input button, a menu button, a power button, and the like on the remote control, so as to control functions of the display apparatus 200.

In some embodiments, the display apparatus 200 can also be controlled via a smart device such as a mobile terminal, a tablet, a computer, or a notebook computer etc. For example, the display apparatus 200 may be controlled through an application running on the smart device. The application can be configured to provide the user with various controls in an intuitive user interface (UI) on a screen associated with the smart device.

In some embodiments, software applications may be installed in the mobile terminal 300 and the display apparatus 200, and then communication may be realized according to network communication protocols, thereby achieving data communications by a one-to-one control operation. For example, the mobile terminal 300 can be used to establish a control instruction protocol with the display apparatus 200, so that a remote-control keyboard can be connected/synchronized with the mobile terminal 300 to achieve a function of controlling the display apparatus 200 by operating a user interface on the mobile terminal 300. Audio and video contents displayed on the mobile terminal 300 can also be transmitted onto the display apparatus 200, so as to realize a function of synchronous display.

FIG. 1 also shows that the display apparatus 200 also performs data communications with a server 400 via a plurality of communication methods. The display apparatus 200 is configured to establish communication connections through a local area network (LAN), a wireless local area network (WLAN), and other networks. The server 400 can provide various contents and interactions for the display apparatus 200. For example, the display apparatus 200 receives software program updates or accesses a remote digital media library through information transmission and reception of electronic program guide (EPG) interactions. The server 400 may provide other network services such as video-on-demand and advertising services.

The display apparatus 200 may be a liquid crystal display, an OLED display, or a projection display apparatus.

In addition to providing a broadcast reception television function, the display apparatus 200 may also provide a computer-supported smart network television function, including, but not limited to, an Internet television, a smart television, an Internet protocol television (IPTV), and the like.

Figure 2:
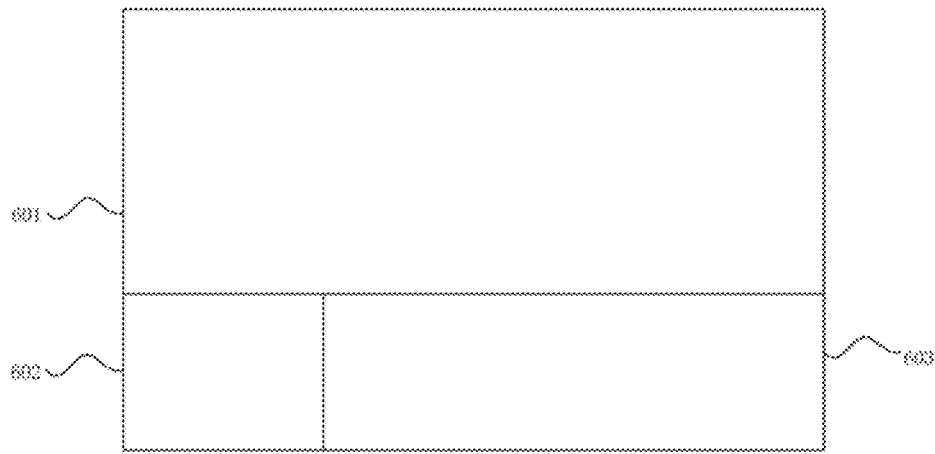
FIG. 2 shows a user interface according to some embodiments of the present disclosure.

FIG. 2 shows a user interface according to some embodiments of the present disclosure. As shown in FIG. 2, the user interface includes a plurality of view display areas 601 to 603, which are respectively used to display different contents, such as a window for playing video, a navigation bar related to currently displayed content, an information display area, and/or a function option bar, etc. The information display area is mainly used to display various types of information, and the function option bar is mainly used to instruct a user to open corresponding services, applications, and the like accordingly.

In the user interface shown in FIG. 2, different view display areas may be different areas in a same layer, or may be areas in different layers. In some embodiments, different view display areas, especially view display areas belonging to different layers, can overlap with each other partially or completely. It should be understood that the layer mentioned herein may comprise an OSD layer (a user interface layer), or a video layer.

In some embodiments, the view display area 601 refers to a play window, and the view display area 602 and/or the view display area 603 is located in the OSD layer over a video play window.

In some embodiments, the OSD layer over the video play window can also include other display areas for displaying set contents.

In some embodiments, the view display area 602 and the view display area 603 may not be distinguished in the OSD layer over the video play window; rather, the OSD layer serves as a screenshot display area to directly display control settings.

In some embodiments, during any content display, the user can input a command for triggering image recognition, to control the display apparatus to perform image recognition on a part or all of currently displayed content. For example, when the user watches a video program, the display apparatus is controlled to perform image recognition on a currently displayed video image by inputting a command for triggering image recognition. For another example, when the user watches a system homepage that does not include a video image, the display apparatus is controlled to perform image recognition on a currently displayed user interface by inputting a command for triggering image recognition. For yet another example, when the user browses a local picture, the display apparatus is controlled to perform image recognition on a currently played local picture file by inputting a command for triggering image recognition.

Screenshot capturing refers to cutting an image containing a part or all of content currently displayed on the display, to obtain a screenshot image. User input for triggering screenshot capture may be in the form of a key, of a voice, or of a gesture.

In some embodiments, the user input for triggering screenshot capture is also the foregoing user input for triggering image recognition. When a user input for capturing a screenshot in different scenarios is received, a same screenshot capturing process or different screenshot capturing processes are carried out according to different scenarios. For example, when a command for capturing a screenshot is received while display content on the display, screenshot content that is completely the same as currently displayed content on the display is obtained. The currently displayed content can be a user interface, a video image or a video image with selectable controls. Alternatively, when a command for capturing a screenshot is received while displaying a picture or video, screenshot content consistent with the currently displayed picture or video image is obtained. A difference is that regarding the former, a screenshot capturing operation is performed after the video layer and the OSD layer are synthesized, or the obtained contents are combined after images in the video layer and the OSD layer are cut respectively. As for the latter, a screenshot capturing operation is performed before the video layer and the OSD layer are synthesized, or only an image in the video layer is obtained.

In some embodiments, a time point for performing screenshot capturing on the current play content may be the time point when input for screenshot capturing is received, or may be a time point ahead of or after a preset duration.

Figure 3:
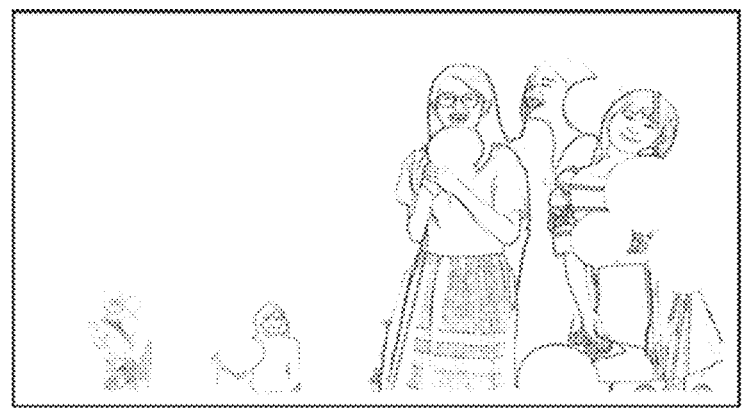
FIG. 3 shows a user interface according to some embodiments of the present disclosure.

FIG. 3 to FIG. 7. are schematic diagrams of a user interface according to some embodiments of the present disclosure. In FIG. 3, a video is played in full screen on a display. When a display apparatus plays a video program, screenshot capturing and recognition of a screenshot image can be triggered in various ways such as via buttons of a remote control, soft buttons on a touch screen, voice commands, and gestures.

Figure 4:
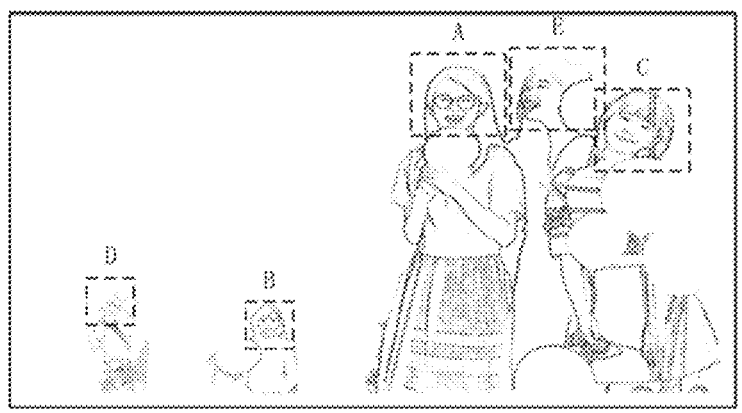
FIG. 4 shows a user interface according to some embodiments of the present disclosure.

In some embodiments, the recognition of the screenshot image may be recognition of an object in the image. As shown in FIG. 4, A to E in FIG. 4 represent face information to be recognized. After user input for triggering screenshot capturing is received by the display apparatus, a recognition result obtained by recognizing the face information to be recognized in the screenshot image is displayed. In some embodiments, the recognition of the screenshot image may also be recognition of a commercial object, plant, or the like in the image.

In some embodiments, after user input for triggering screenshot capturing is received by the display apparatus, a user interface including an area for displaying the current play content and an area for displaying the screenshot content is displayed. An image of the current play content continues to be displayed in the area for displaying the current play content, and a plurality of option bars are displayed in the area for displaying the screenshot content. In these plurality of option bars, at least one option bar is configured to display a recognition result of an object (such as a character, an item, or clothing) in the image or to display text/image which shows the recognition result, and the other option bars can be used to display a thumbnail of the screenshot image, recommendation content related to the recognition result (the object(s)), or operation controls for functions associated with screenshot.

In some embodiments, to display an image of the current play content in a play window in the area for displaying the current play content, current video content may be played continuously, or a frozen image may be displayed upon pausing the playing of the current video content.

In some embodiments, the recognition result displayed in the option bar may specifically be a keyword most related to the object in the screenshot image and content profile, a picture, and/or a content source or a type related to the keyword. For example, when the video play image shown in FIG. 3 is displayed, if the user input for triggering screenshot capturing is received, in response to the user input, a screenshot image of the video play image is obtained through screenshot capturing, and a keyword matching with an object in the screenshot image, and content descriptions, and/or a content source, or a type related to the keyword are obtained. For example, facial information of a character object in a screenshot is obtained, so as to recognize the character object in the screenshot image, thereby obtaining a keyword "QX" that matches with facial information of an actor who plays a character in the play. For another example, by recognizing clothing of a character in the screenshot image, keywords such as "dress" and "QX star style" that match with the clothing of the character in the play are obtained. In this case, the foregoing keyword and the content profile, the picture, and/or the content source or the type related to the keyword are displayed in the option bar for displaying the recognition result.

In the implementation scenario described in the foregoing examples, to ensure the accuracy of the image recognition result presented for the user, the recognition result is displayed only when similarity between the recognition result and the corresponding object in the image reaches a preset threshold. Otherwise, the recognition result is not displayed, that is, there is no recognition result. For example, if it is determined, through an image recognition technology, that similarity between the facial information in the screenshot and facial information corresponding to the keyword in a database is greater than a preset value (for example, 90%), the keyword and related content profile are taken as a recognition result for display. If it is determined, through the image recognition technology, that the similarity between the facial information in the screenshot and the facial information corresponding to the keyword in the database is not greater than the preset value, it is considered that there is no recognition result. In this way, a higher preset similarity threshold indicates higher accuracy of the recognition result that is displayed for the user. However, if the similarity threshold is higher, fewer or even no recognition results meet the condition, that is, fewer or even no objects can be recognized. Therefore, a smaller amount of information about the recognition result is displayed to the user, and correct recognition result is likely to be missed. On the contrary, when the preset similarity threshold is higher, there are more recognition results that meet the condition, that is, more objects can be recognized, but the accuracy of the recognition result displayed to the user is lower.

For example, in the screenshot image shown in FIG. 4, there are five objects, A, B, C, D, and E. It is assumed that after a command for capturing a screenshot is received, through image recognition, keywords "QX", "LT", "WZW", "YZ", and "JX" are respectively the recognition results corresponding to the objects A, B, C, D, and E, and corresponding content profile are obtained. Moreover, similarity between facial information of "QX" and facial information of the subject A is 95%, similarity between facial information of "LT" and facial information of the subject B is 81%, similarity between facial information of "WZW" and facial information of the subject C is 87%, similarity between facial information of "YZ" and facial information of the subject D is 75%, and similarity between facial information of "JX" and facial information of the subject E is 50%.

Figure 5:
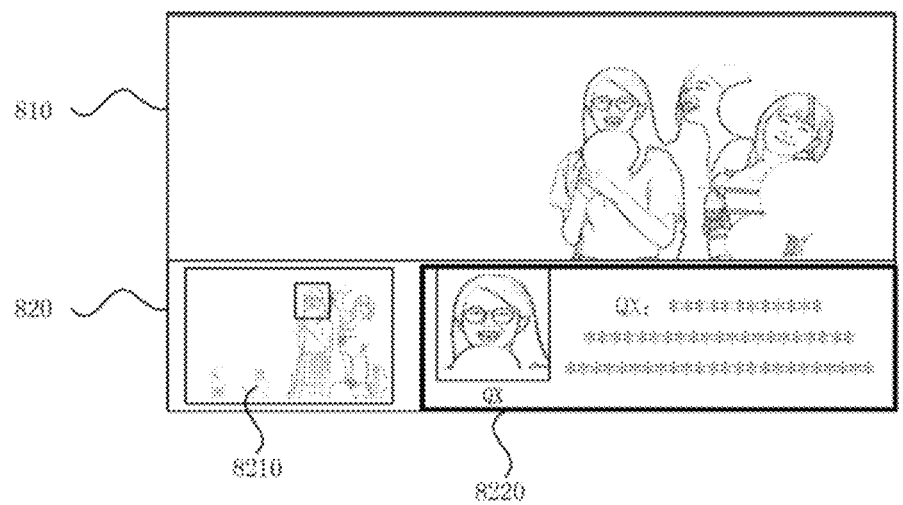
FIG. 5 shows a user interface according to some embodiments of the present disclosure.

In the foregoing example, if the threshold of the similarity is set to be 90% for determining whether the recognition result corresponding to each object meets the condition for display, the recognition result that meets the condition for display includes only "QX" corresponding to the object A. FIG. 5 is a schematic diagram of a user interface shown in some embodiments of the present disclosure. The user interface is specifically a user interface displayed after a command for capturing a screenshot is received when the image shown in FIG. 3 is displayed. As shown in FIG. 5, the user interface includes an area 810 for displaying current content and an area 820 for displaying screenshot content. In the area 820 for displaying the screenshot content, the thumbnail of the screenshot image and an interface for inputting user commands for functions associated with screenshot are displayed in a bar 8210 for displaying the screenshot content. The interface for inputting user commands may be, for example, an operation control for obtaining a QR code of the screenshot, or an operation control for the user to share the screenshot image to an XX social media. A screenshot area (a face region) corresponding to the object A in the screenshot image shown in FIG. 4, the keyword "QX" matching with the object A, and content profile related to "QX" that "QX, born on Nov. 23, 1993 in . . . , officially entered the show business by playing a role in the family drama "Qi Jiu He Kai" . . . " are displayed in a bar 8220 for displaying a recognized character. As shown in this example, a recognition result of one object is displayed to the user, and the accuracy of the displayed recognition result is greater than 90%.

If the preset threshold of the similarity is set to be 85%, the recognition results that meet the condition for displaying include "QX" corresponding to the object A and "WZW" corresponding to the object C. In this case, at least two option bars are displayed in the area for displaying the screenshot content. One option bar is configured to display the screenshot area (the face region) corresponding to the object A in the screenshot image shown in FIG. 4, the keyword "QX" matching with the object A, and the content profile corresponding to "QX". The other option bar is configured to display a screenshot area (a face region) corresponding to the object C in the screenshot image shown in FIG. 4, the keyword "WZW" matching with the object C, and content profile related to "WZW". As shown in this example, recognition results of two objects are displayed to the user, and the accuracy of the displayed recognition results is greater than 85%. It should be noted that, an option bar for displaying other contents, such as an option bar for displaying latest promotion information or an option bar for displaying recognized commercial item information, can also be displayed in the area for displaying the screenshot content.

It can be seen from the foregoing examples that, a higher preset similarity threshold indicates a higher accuracy of the recognition result that is displayed to the user. However, the higher the similarity threshold is set to be, the fewer or even no recognition results that meet the condition would be, that is, fewer or even no objects can be recognized. Therefore, a smaller amount of information about the recognition result is displayed to the user, and the correct recognition result is likely to be missed. On the contrary, if the preset similarity threshold is lower, there are more recognition results that meet the condition, that is, more objects can be recognized, but the accuracy of the recognition result displayed to the user is lower.

In view of the above issue, in some embodiments, the video play window is configured to play a video, and a first floating layer over the video play window is configured to display the recognition result. In some embodiments, the area 810 for displaying the current content may be an area where the video play window is located, and the area 820 for displaying the screenshot content may be an area included in the first floating layer.

In some embodiments, the object may be a character or face information of the character, and the keyword may be a character's name corresponding to the character or the face information.

In some embodiments, whether to display the similarity indication information is determined by the similarity value between the object in the screenshot image and an object in the database. For example, if the first preset value is set to be 90%, the second preset value is set to be 90%, and the third preset value is set to be 80%, when the similarity is greater than the first preset value, only the recognition result is displayed and the similarity indication information is not displayed. When the similarity is greater than the third preset value and is less than or equal to the second preset value, both the recognition result and the similarity indication information are displayed. For example, if a matching degree of first face information in the screenshot image (face information of object A in FIG. 4) to a face image of QX in the database is 95%, the character name "QX" is displayed in the option bar for displaying the recognition result, and the similarity indication information is not displayed. If a matching degree of second face information in the screenshot image (face information of object C in FIG. 4) to a face image of WZW in the database is 87%, "Like WZW" is displayed in a control for displaying the recognition result, where "WZW" is a character name recognized based on the second face information in the screenshot image, and "like" is the similarity indication information. To be specific, the similarity indication information is presented before the character name. If a matching degree of third face information in the screenshot image (face information of object B in FIG. 4) to a face image of LT in the database is 82%, "Like LT" is displayed in the control for displaying the recognition result.

By displaying different similarity indication information, in addition to displaying the accurate recognition result, a less accurate recognition result can also be provided to the user as reference. By contrast, only one similarity recognition threshold is used in related art. When the threshold is set low, there is a high probability of mis-recognition in the displayed result. When the threshold is set high, fewer recognition results may be obtained. These two designs can be balanced in some embodiments. In these embodiments, three thresholds can all be set as required, provided that the second preset value is less than or equal to the first preset value, and the third preset value is less than the second preset value.

In some embodiments, the similarity indication information may also be an alert above the first floating layer.

In some embodiments, the server's feedback does not include recognition results of which the similarity is less than the third preset value. Or alternatively, the server's feedback includes all recognition results, but the recognition result of which the similarity is less than the third preset value are filtered out by the display apparatus, and therefore not displayed.

In some embodiments, in the option bar, the recognition results are sequentially displayed based on degrees of the similarity. To be specific, a thumbnail of the screenshot image is displayed in a layer over the video play window in the video layer, and the option bar is displayed at one side of the thumbnail. The option bar of the recognition result for indicating lower similarity is farther from the thumbnail than the option bar of the recognition result for indicating higher similarity. In this way, it is convenient for the user to pay more attention to the recognition result with a higher similarity. In addition, in some embodiments, a focus frame for currently recognized face is also presented on the screenshot thumbnail, and a recognized character object is identified by the focus frame. In some embodiments, the focus frame is configured to enclosing a face region of the recognized character object in a frame. For example, as shown in FIG. 5, on the screenshot thumbnail displayed in the bar 8210 for displaying the screenshot content, a face region of the object A is identified by a focus frame. The focus frame can provide an indication that the recognition result displayed in the bar 8220 for displaying the recognized character on the right side is the recognition result of the object A in the screenshot image, for the user.

In some embodiments, when only one object is recognized or there is only one object in the screenshot image, while the thumbnail of the screenshot image is displayed, only one recognition result is displayed on the first floating layer for displaying the thumbnail of the screenshot image and the recognition result.

In some embodiments, when more than one objects are recognized or there are multiple objects in the screenshot image, while the thumbnail of the screenshot image is displayed, one recognition result and a switch control for switching between recognized objects are displayed on the first floating layer for displaying the thumbnail of the screenshot image and the recognition result. Upon receiving a selection of the switch control, the display apparatus will switch to other recognition result for display.

In the above example, after the display apparatus receives a user input for triggering image recognition, recognition results corresponding to a plurality of objects in the target image are displayed at the same time. When the similarity between the recognition result and the corresponding object does not fall within a predetermined range, the recognition result is presented in association with the similarity indication information. The similarity indication information is used to indicate the similarity degree between the recognition result and the corresponding object. In this way, it can be ensured that sufficient recognition results are displayed to the user by lowering the similarity threshold. Meanwhile, displaying the similarity indication information in association with the recognition result, allows the user to know the accuracy of the recognition result of each object.

In some embodiments, a user input for triggering recognition of the target image may be a user input for triggering screenshot capturing. Correspondingly, the target image to be recognized is the screenshot image obtained in response to the user input for triggering screenshot capture. The recognition result corresponding to the object in the target image comprises relevant information matching with the object. In these embodiments, in response to the user input for triggering screenshot capture, the display apparatus can display an area for presenting recognition content while continuing playing the content in the play window or in the video layer. The area for displaying the recognition content is configured to display relevant information of at least one object in the screenshot image. When similarity between the relevant information and the corresponding object does not fall within the predetermined range, the relevant information is presented associated with the similarity indication information. The similarity indication information is used to indicate the degree of similarity between the relevant information and the corresponding object.

Hereinafter, the specific embodiments of the present disclosure are discussed by taking image recognition of the screenshot image and displaying the recognition result of the screenshot image as an example.

When the user input for triggering the recognition of the target image is the user input for triggering screenshot capture, the display apparatus obtains a screenshot image by capturing a screenshot of image content that is currently displayed on the display, to serve as the target image.

In some embodiments, the display apparatus sends the target image to the server. The target image is processed with feature recognition by the server, and is compared with a preset feature database to obtain the recognition result of the object included in the target image. In some other embodiments, the object in the target image is recognized by the display apparatus, and then information about the recognized object is sent to the server. The object is recognized by the server based on the object information sent from the display apparatus, to obtain the recognition result corresponding to the object. When the object in the target image is a character object, recognizing the object in the target image by the display apparatus is to recognize the face information, and sending the information about the recognized object to the server is to send a face-area image to the server.

In some other embodiments, the object in the target image is recognized by the display apparatus independently. To be specific, an image feature of the target image is extracted, and then the extracted image feature is compared with a preset feature database, to obtain the recognition result corresponding to the object.

It should be understood that, due to factors such as the size and resolution of an image corresponding to the object in the target image, and comprehensiveness of feature data included in the feature database, accuracy of the recognition results for various objects in the target image is not exactly the same. For example, the recognition results of some objects have relatively high similarity to the corresponding objects, that is, the recognition results are more accurate; and the recognition results of some objects have relatively low similarity to the corresponding objects, that is, the recognition results are not accurate enough.

In some embodiments, whether each recognition result meets the condition for display is determined by determining whether the similarity between each recognition result and the corresponding object is greater than the preset value, and the recognition result that meets the condition for display is displayed to the user.

Specifically, after the image recognition is completed by the server, the recognition results corresponding to all objects in the target image and the corresponding similarity data, are returned to the display apparatus. The display apparatus retains the recognition result that meets the condition for display, and discards the recognition result that does not meet the condition for display. In some other embodiments, after the image recognition is completed by the server, the recognition result that meets the condition for display and the corresponding similarity are returned to the display apparatus, and the recognition result that does not meet the condition for display is directly deleted.

In this way, a quantity of recognition results that meets the condition for display can be adjusted by adjusting a value of the preset value.

In some embodiments, for the recognition results that meet the condition for display, the recognition result whose similarity falls within a predetermined range is regarded as an accurate recognition result, and the recognition result whose similarity does not fall within the predetermined range is regarded as a similar recognition result. For the similar recognition result, by displaying the associated similarity indication information, it is convenient for the user to know the similarity between each recognition result and the corresponding object and differences in accuracy between various recognition results.

In some embodiments, the recognition result whose similarity with the corresponding object fall within a first range is normally displayed, that is, the similarity indication information is not presented around or near the recognized object; and the recognition result whose similarity with the corresponding object falls within a second range is displayed in association with the similarity indication information. There is no overlapping between the first numerical range and the second numerical range. For example, the first numerical range can be (90% to 100%), and the second numerical range is (80% to 90%). In some embodiments, the recognition result of the object in the screenshot image includes the keyword that matches with the object, that is, the character name that matches with the face information of the object. For example, by recognizing the object A in the screenshot image shown in FIG. 4, the keyword "QX" that matches with the actor who plays the character in the play is obtained.

For example, in the example shown in FIG. 4, if the preset value is set to 80% for determining whether the recognition result corresponding to each object meets the condition for display, the recognition result meeting the condition for display includes "QX" corresponding to the object A, "LT" corresponding to the object B, and "WZW" corresponding to the object C. If the predetermined numerical range is set as >90% for determining whether the recognition result corresponding to each object is an accurate recognition result, the recognition result "QX" of the object A is an accurate recognition result, and the recognition result "LT" corresponding to the object B and the recognition result "WZW" corresponding to the object C are both similar recognition results. In this case, when the image shown in FIG. 4 is displayed, if a user input for triggering screenshot capturing is received, the recognition results corresponding to the objects A, B, and C, that is, "QX", "LT", and "WZW", may be displayed to the user. Moreover, the recognition results corresponding to the objects B and C are displayed in association with the corresponding similarity indication information, so as to prompt the user, through the similarity indication information, that the similarity between "LT" and the object B in the image and the similarity between "WZW" and the object C in the image are less than or equal to 90%.

In some embodiments, the recognition result that meets the condition for display is displayed in the user interface in a form of an option bar.

In some embodiments, the character name and a character image in the recognition result can share one option bar. As shown in FIG. 6a to FIG. 6e, in some embodiments, different option bars may be used for the character name and the character image, respectively, as shown in FIG. 8b and FIG. 8d to FIG. 8f.

Figure 6A:
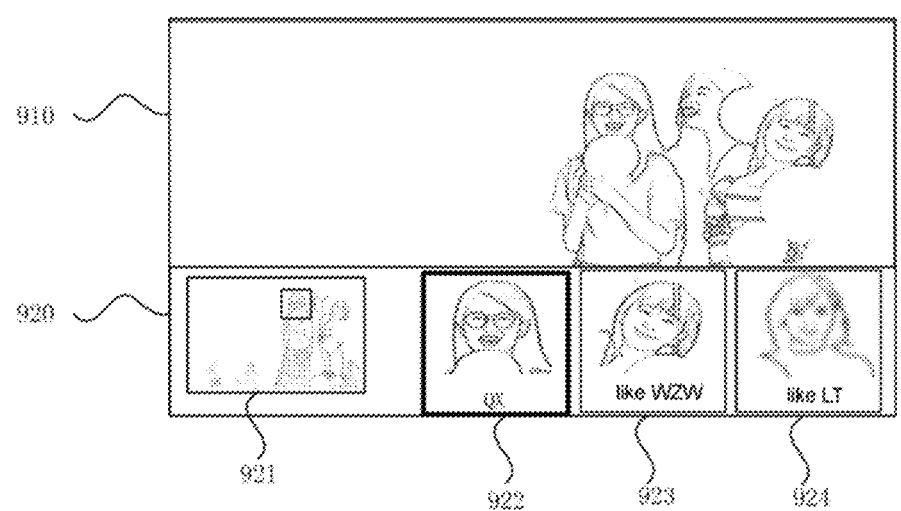
FIG. 6a to FIG. 6e show a user interface according to some embodiments of the present disclosure.

FIG. 6a is a schematic diagram of a user interface shown in some embodiments of the present disclosure. The user interface is specifically a user interface displayed after an instruction for image recognition is received when the image shown in FIG. 3 or FIG. 4 is displayed. As shown in FIG. 6a, the user interface includes an area 910 for displaying the current content and an area 920 for displaying option bars. An image of a currently played video continues being displayed in the area for displaying the current content 910, that is, the video continues being displayed in the video play window. In the area 920 for displaying option bars, the thumbnail of the screenshot image is displayed in an option bar 921, and an interface for inputting a user command for functions associated with screenshot can also be highlighted. A screenshot area corresponding to the object A in the screenshot image (for example, a face-area image or a thumbnail of the face-area image) and the keyword "QX" matching with the object A are displayed in an option bar 922. A screenshot area corresponding to the object B in the screenshot image, the keyword "LT" matching with the object B, and the similarity indication information "like" are displayed in an option bar 924. A screenshot area corresponding to the object C in the screenshot image, the keyword "WZW" matching with the object C, and the similarity indication information "like" are displayed in an option bar 923. It should be noted that there are more than one optional forms for the similarity indication information, including but not limited to adding the word "like" before the keyword matching with the object. The similarity value between the recognition result and the corresponding object can also be directly displayed in an indication flag by adding the indication flag in the recognition-result option bar.

In some embodiments, a reference picture corresponding to the character name in the database is replaced with the screenshot area corresponding to the object, without carrying the reference picture in the database in recognition and transmission processes. In this way, a loading speed of the recognition result can be improved, and the recognition result can be easily associated with the character object in the current video.

In some embodiments, the option bar includes two controls. One control is configured to load an image, that is, to load the screenshot area corresponding to the object in the screenshot image. The other control is configured to load text information (such as the character name) based on the recognition result. In some embodiments, a corresponding field is marked in the server or in the recognition result generated by the server, and the control loads the field of the corresponding text information in the recognition result based on the mark.

In some embodiments, the control for image loading may load an image of corresponding character information in a resource library, instead of loading an image of the screenshot area corresponding to the object in the screenshot image.

In some embodiments, based on a comparison result of the similarity, the similarity indication information is added in a field of text information corresponding to a recognition result whose similarity does not meet a predetermined condition. For example, after face comparison is performed, text information representing a character name is written into a field of text information corresponding to a recognition result whose similarity meets the predetermined condition, and the similarity indication information and the text information representing a character name are written into the field of the text information corresponding to the recognition result whose similarity does not meet the predetermined condition.

In some embodiments, based on the comparison result of the similarity, only the text information representing a character name is written into the field of the text information corresponding to the recognition result whose similarity does not meet the predetermined condition. For example, after the face comparison is performed, the text information representing a character name is written into fields of text information corresponding to all recognition results. In a process of loading the option bar, the display apparatus directly loads and displays the field of the text information corresponding to the recognition result whose similarity meets the predetermined condition, and displays the field of the text information corresponding to the recognition result whose similarity does not meet the predetermined condition after the similarity indication information is added.

In some embodiments, the display apparatus marks and collects object areas in the screenshot image, and sends collected results to the server for comparison. In this case, the screenshot area corresponding to the object can be associated with a request for comparison or can be marked by using an identifier. After the server sends back the recognition result, the object area in the screenshot image is directly loaded in the option bar corresponding to the recognition result based on an association relationship or the identifier.

In some embodiments, a plurality of recognition results is simultaneously displayed in the area for displaying the screenshot content in a form of an option bar.

In the area for displaying the screenshot content, a user-selected or pre-selected item, such as the recognition-result option bar or a function control, is indicated by using a focus frame. A position of the focus frame for content selection can be moved in response to user input for moving the focus frame.

Figure 6B:
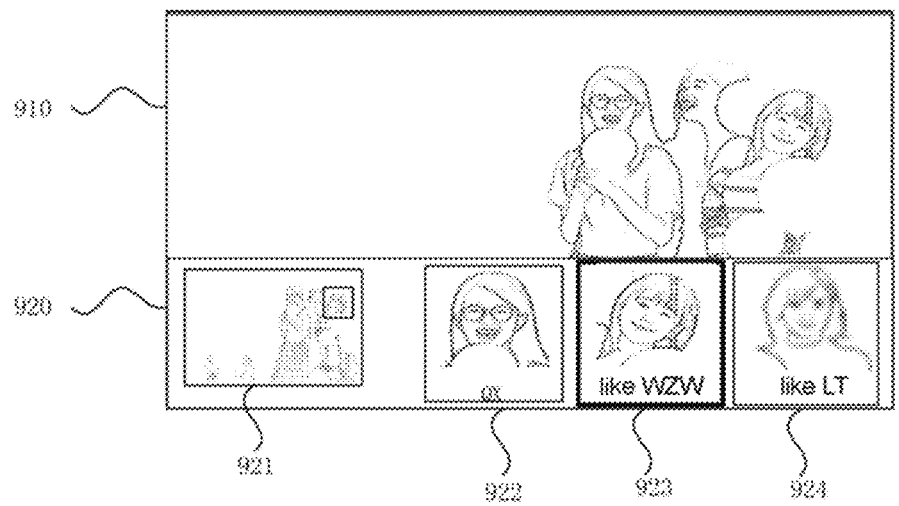

In some embodiments, the display position of the focus frame for facial recognition on the screenshot thumbnail is associated with the display position of the focus frame for content selection. In other words, the display position of the focus frame for facial recognition moves with the movement of the focus frame for content selection, thereby ensuring that a character object identified by the focus frame for facial recognition corresponds to the user-selected or the pre-selected recognition-result option bar. For example, in the example shown in FIG. 6a, since the focus frame for content selection is displayed in the option bar displaying "QX", the focus frame for facial recognition is displayed on the face region of the object A. As shown in FIG. 6b, when the focus frame for content selection is moved to the option bar displaying "Like WZW" in response to a user input, the focus frame for facial recognition may be moved to the face region of the object C accordingly.

In some embodiments, the focus frame for facial recognition is only used to indicate a position of the recognized object on the thumbnail, and cannot be selected as a focus. In this case, it is convenient for people to notice the position of the object on the thumbnail, and at the same time, operation experience of the user will not be affected because the focus stays on the thumbnail.

It should be noted that the focus frame for facial recognition and the focus frame for content selection may be, as shown in FIG. 6a and FIG. 6b, a frame displayed in the face region of the character object and a frame displayed around the option bar. It should be understood that, although the focus frame for facial recognition and the focus frame for content selection are exemplarily shown in the form of frames in the specification of the present disclosure, the focus frame for facial recognition and the focus frame for content selection may also be in other forms that can visually identify the character object and content selected by the user. For example, in addition to a square frame, the focus for indicating content selection may also be based on different colors, shades, text, or backgrounds.

Figure 6C:
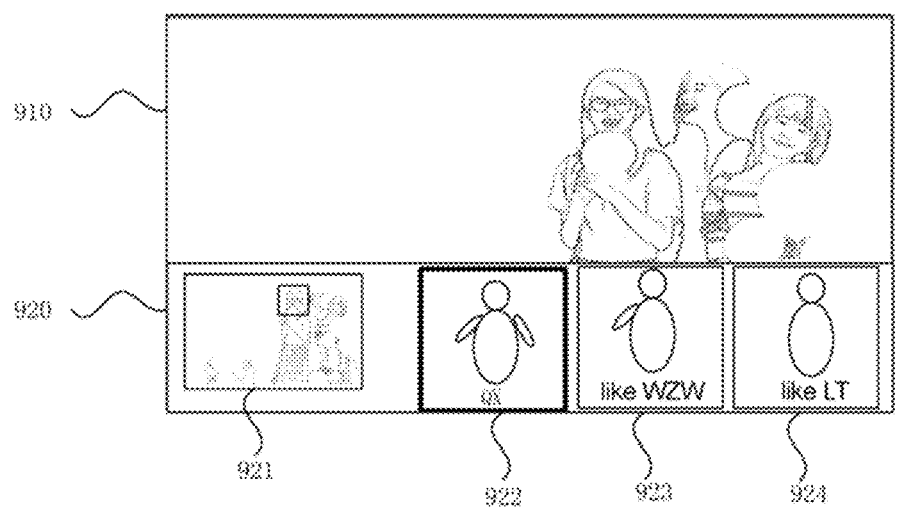

In some embodiments, the screenshot area corresponding to the object may not be displayed in the recognition-result option bar, but a picture corresponding to the keyword in the recognition result is displayed. For example, as shown in FIG. 6c, the keyword "QX" that matches with the object A and wikipedia cover, Weibo avatar, or any selected picture of the keyword "QX" are displayed in the option bar 922; the keyword "LT" that matches with the object B, wikipedia cover, Weibo avatar, or any selected picture of "LT", and the similarity indication information "like" are displayed in the option bar 924; and the keyword "WZW" that matches with the object C, wikipedia cover, Weibo avatar, or any selected picture of "WZW", and the similarity indication information "like" are displayed in the option bar 923. In this case, the image in the recognition result can be a pre-stored reference picture in an image library. Compared with the face region in the displayed screenshot, a character image more familiar to the public can be displayed.

Figure 6D:
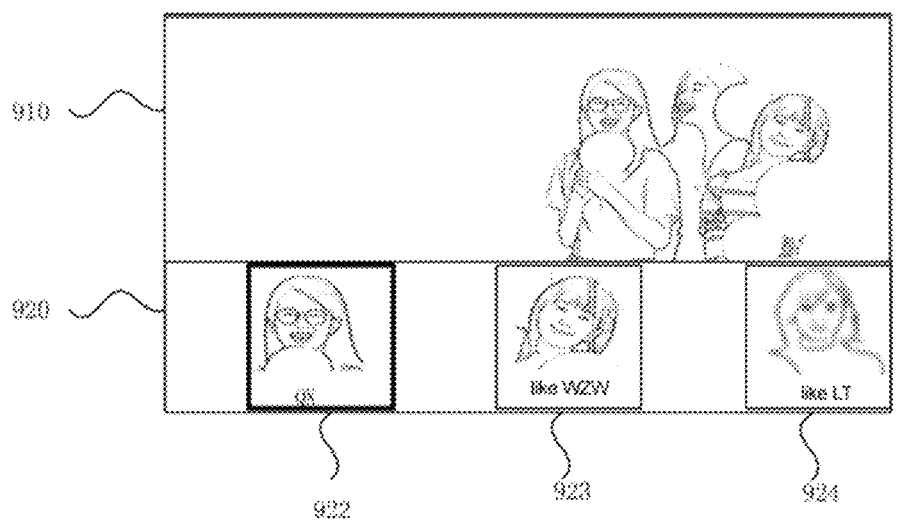
Figure 6E:
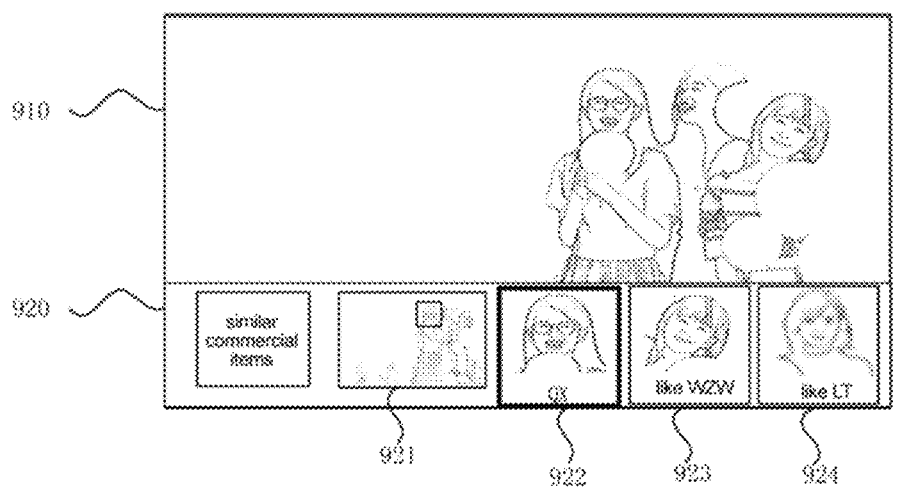

In some embodiments, the thumbnail of the screenshot image and the corresponding option bar may not be displayed in the area for displaying the screenshot content or the area for displaying option bars. As shown in FIG. 6d, the thumbnail of the screenshot image (the option bar 921 in FIG. 6a to FIG. 6c) is no longer displayed in the area 920 for displaying option bars.

In some embodiments, recognition of the screenshot image refers to recognition of both one or more character objects and one or more commercial objects in the screenshot image. Thus, the recognition result includes the character recognition result described in the foregoing embodiments, and also includes a recognition result of commercial objects or items.

In some embodiments, in addition to an option bar for thumbnails of the screenshot image and an option bar for character recognition results, an option bar for similar commercial items can also be displayed in the area for displaying the screenshot content or the area for displaying option bars. The commercial recognition result, such as item information (title, category, style, and the like) or a buying link that matches with the commercial object in the screenshot image is displayed in the option bar for similar commercial items. For example, in FIG. 6e, in addition to the option bar for thumbnails of the screenshot image and the character recognition result, the option bar for indicating one or more similar commercial items that is configured to display the recognition result of a commercial item is also displayed.

In some embodiments, the option bar for displaying similar commercial items can only serve as an entry to a secondary page.

Figure 7:
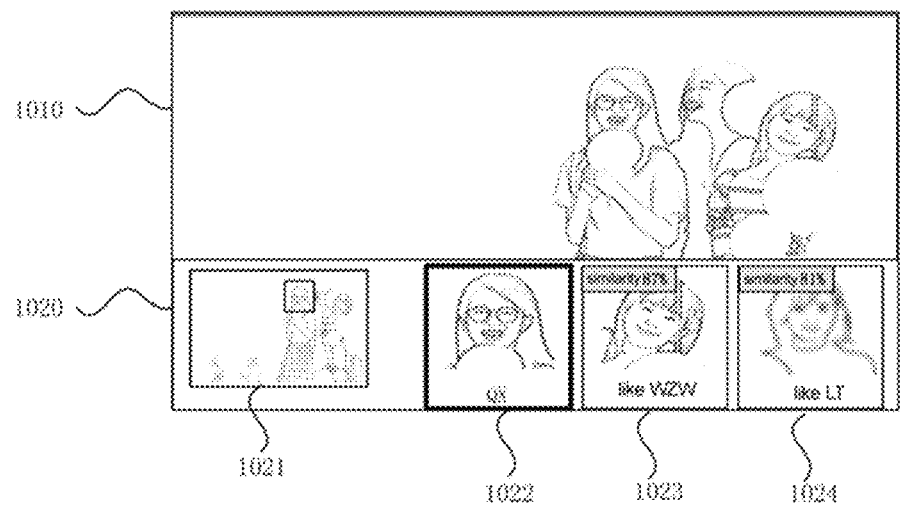
FIG. 7 shows a user interface according to some embodiments of the present disclosure.

FIG. 7 is a schematic diagram of a user interface shown in some embodiments of the present disclosure. The user interface is specifically a user interface displayed after a screenshot capturing command is received when the image shown in FIG. 3 is displayed. Different from the user interface shown in FIG. 6a, an option bar 1023 includes an indication flag. Similarity indication information "similarity 87%" is displayed in the indication flag, for indicating that similarity between the keyword "WZW" and the object C is "87%". An option bar 1024 includes an indication flag. Similarity indication information "similarity 81%" is displayed in the indication flag, for indicating that similarity between the keyword "LT" and the object B is "81%".

In some embodiments, the indication flag can be located in a layer over the first layer where the option bar is located.

In some embodiments, in the area for displaying option bars, option bars for displaying the recognition results are arranged in a descending order based on the similarity between the displayed recognition results and the corresponding objects. For example, in the user interfaces shown in FIG. 6a and FIG. 7, a recognition-result option bar corresponding to the object A is displayed first, a recognition-result option bar corresponding to the object C is displayed in the middle, and a recognition-result option bar corresponding to the object B is displayed at the end.

It should be understood that, the user can set a quantity of option bars that can be displayed in the area for displaying option bars through system settings, for example not greater than 3. The user can drag out a hidden option bar and/or hide a displayed option bar by adjusting a progress-bar control in the area for displaying option bars. In some embodiments, an option bar selected by the user is identified by a focus frame in the area for displaying option bars. For example, in FIG. 7, the focus frame is a square frame surrounding an option bar 1022. Based on user input for moving the position of the focus frame, the user can view detailed information corresponding to the selected option bar or start an application, a web page, a service, and the like that are associated with the selected option bar. For example, when the option bar 1022 is selected and confirmed by the user, content profile related to the keyword "QX" is displayed.

In some other embodiments, a plurality of recognition results that meet the condition for display and screenshots of the corresponding objects are displayed in an area for displaying the recognition results in a form similar to a list. After the screenshot capturing command is received by the display apparatus, the user interface including the area for displaying the current play content, the area for displaying option bars, and the area for displaying the recognition content is displayed. The area for displaying the current play content is configured to continue to display an image of the current play content. The area for displaying option bars is configured to display a plurality of option bars, for example, an option bar for displaying the target image and an option bar for displaying promotion information. The area for displaying the recognition content is configured to display the recognition result that meets the condition for display and the screenshot of the corresponding object in a form similar to a list.

Figure 8A:
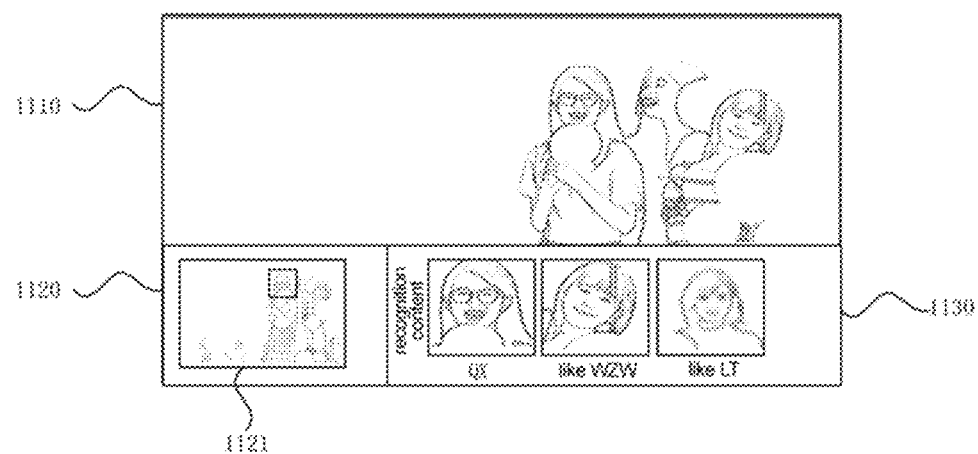
FIG. 8a to FIG. 8f show a user interface according to some embodiments of the present disclosure.

For example, FIG. 8*a* shows a user interface that is displayed after a command for capturing a screenshot is received when the image shown in FIG. 3 is displayed. As shown in FIG. 8*a*, the image of the current play content continues being displayed in an area 1110 for displaying current play content. An option bar 1121 for screenshot images is displayed in an area 1120 for displaying option bars. The thumbnail of the screenshot image is displayed in the option bar 1121 for screenshot images, and the focus frame for facial recognition can also be displayed therein, where the focus frame for facial recognition displays the face region of the object A. A screenshot and the matched keyword "QX" of the object A, a screenshot, the matched keyword, and associated similarity indication information "Like WZW" of the object C, and a screenshot, the matching keyword, and associated similarity indication information "Like LT" of the object B are displayed in an area 1130 for displaying recognition content, where the object A, the object B, and the object C are in the screenshot image. The focus frame for content selection is displayed on a control corresponding to "QX".

In some embodiments, the keyword and the object image are located on different controls in the option bar, and controls respectively corresponding to the keyword and the object image of the same recognition result cannot obtain the focus at the same time.

In some embodiments, the keyword, the object image, and information about the content profile are located on different controls in the option bar, and controls respectively corresponding to the keyword, the object image, and the information about the content profile of the same recognition result cannot obtain the focus at the same time.

In some embodiments, detailed information such as keyword-related content profile is displayed in an option bar or a control that is available for operation or selection, and the user can trigger the display of full text of the content profile and other detailed information by operating the option bar.

In some embodiments, in response to a user operation of an option bar for displaying the content profile, display of other recognition result can be canceled, and only full text of the selected content profile is displayed in the area for displaying the recognition content. The full text of the content profile can also be enlarged for displaying, and/or a display area for the full text can be enlarged. For example, the area for displaying the recognition content can be enlarged, so that a size of the area for displaying the recognition content can be adapted to a volume of the full text of the content profile. For example, in the user interface shown in FIG. 8*c*, the screenshot area corresponding to the object A in the screenshot image, the keyword "QX", and the full text of the related content profile are displayed in the area for displaying the recognition content.

Similar to the move process of the focus frame for facial recognition shown in FIG. 6*a* and FIG. 6*b*, when the user interface shown in FIG. 8*a* is displayed, if the focus frame for content selection is moved from "QX" to "Like WZW" by the user through an input operation, the focus frame for facial recognition may be moved from the face region of the object A to the face region of the object C.

Figure 8B:
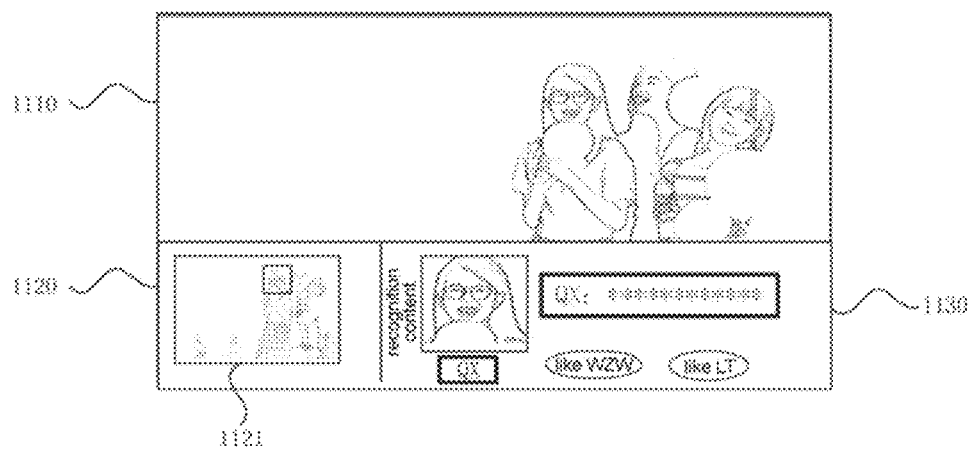
Figure 8C:
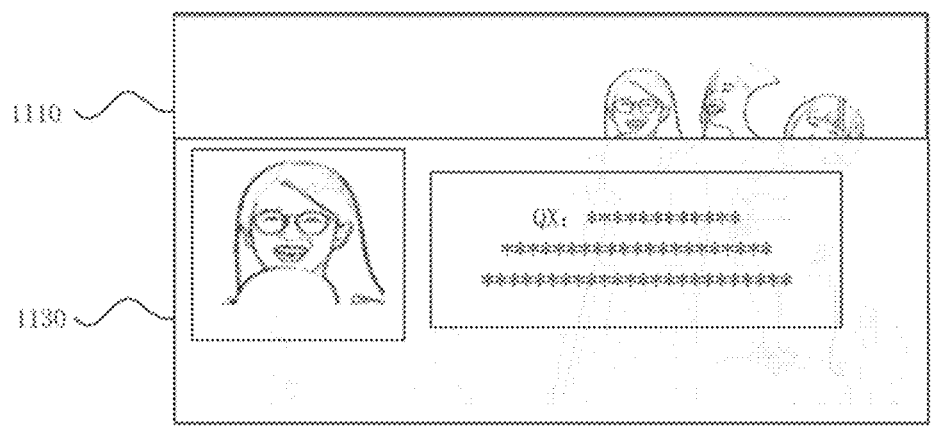

In some embodiments, for the accurate recognition result, a control including the keyword is displayed in the area for displaying the recognition results. For the similar recognition result, a control including the keyword and the corresponding similarity indication information are displayed in the area for displaying the recognition results. Meanwhile, the focus frame for content selection is displayed to indicate the user-selected or pre-selected item. When the focus frame for content selection falls on the foregoing control including the keyword or the control including the keyword and the similarity indication information, display of detailed information about the keyword such as the content profile related to the keyword selected by the user is triggered. When the focus frame for content selection is moved to a control of other keywords by the user through an input operation, display of content profile related to the other keywords is triggered. For example, controls of "QX", "Like WZW", and "Like LT" are sequentially displayed in the user interface shown in FIG. 8*b*. Because the focus frame for content selection falls on the control of "QX", the content profile related to "QX" that "QX, born on Nov. 23, 1993 in . . . " is also displayed in the area for displaying the recognition content. When the focus frame for content selection is moved to the control of "Like WZW" by the user, the user interface shown in FIG. 8*b* is updated to the interface shown in FIG. 8*d*. Controls of "QX", "Like WZW", and "Like LT" are sequentially displayed in the user interface shown in FIG. 8*b*. Because the focus frame for content selection falls on the control of "Like WZW", content profile related to "WZW" that "WZW, . . . " is also displayed in the area for displaying the recognition content. In other words, when the predetermined condition is met, only the character name is displayed, and "like" is added before the name when the predetermined condition is not met.

Figure 8D:
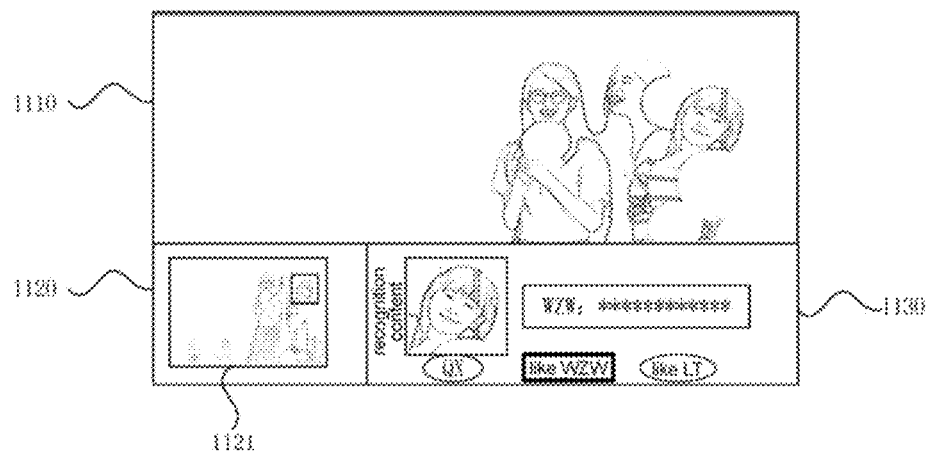

In some embodiments, controls of "QX", "Like WZW", and "Like LT" are sequentially displayed in the user interfaces shown in FIG. 8*b* and FIG. 8*d*. Because the focus frame for content selection falls on the control of "QX", the content profile related to "QX" that "QX, born on Nov. 23, 1993 in . . . " is also displayed in the area for displaying the recognition content. When the focus frame for content selection is moved to the control of "Like WZW" by the user, the user interface shown in FIG. 8*b* is changed to the interface shown in FIG. 8*d*. In this case, areas for displaying the recognition content that are used for displaying the object image and the profile information are a same control, and keywords are in a separate control (option bar). When option bars for different objects are selected, the image and the profile information in the recognition result of the corresponding option bar are loaded by the control corresponding to the area for displaying the recognition content.

In some embodiments, when the focus frame for content selection falls on a control of a similar recognition result of a certain character object, in addition to a first keyword and first content profile that match with the object, a second keyword and second content profile that are associated with an object can also be displayed. The second keyword may be a character keyword that affects character similarity between a character corresponding to the first keyword and a character in a screenshot. For example, the similarity between the character in the screenshot and the character corresponding to the first keyword is not sufficient because the character in the screenshot is more similar to the character corresponding to the second keyword. In addition, the second keyword may also be a keyword of the role name played in current content by the character corresponding to the first keyword.

Figure 8E:
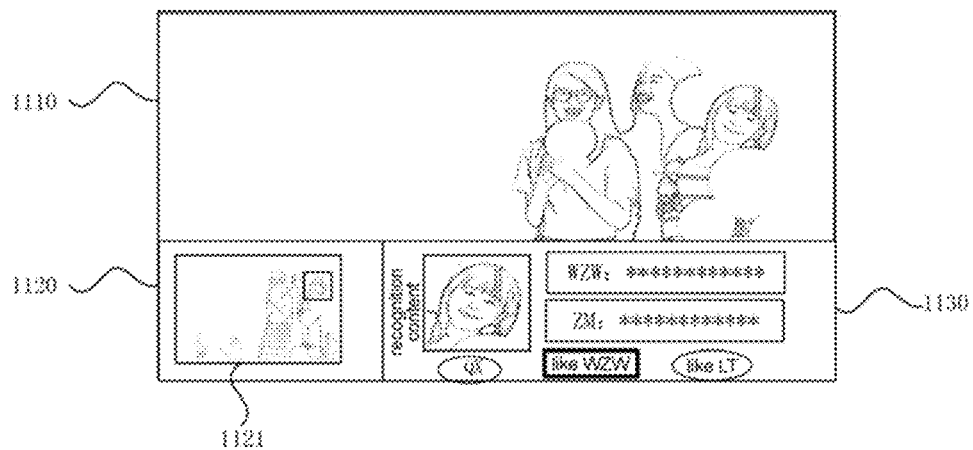

For example, in the user interface shown in FIG. 8e, when the focus frame for content selection falls on the control of "Like WZW", the content profile related to the keyword "WZW", and another keyword "ZM" and content profile that are associated with the object C are displayed in the area for displaying the recognition content. For example, similarity between the object and the image of WZW in the database is 81%, and similarity between the object and the image of ZM in the database is 60%. In other words, ZM is a character name of a character whose similarity with the object ranks the second. Because the recognition result is not an accurate recognition result, information about at least two characters that are similar to the object is displayed at the same time.

Figure 8F:
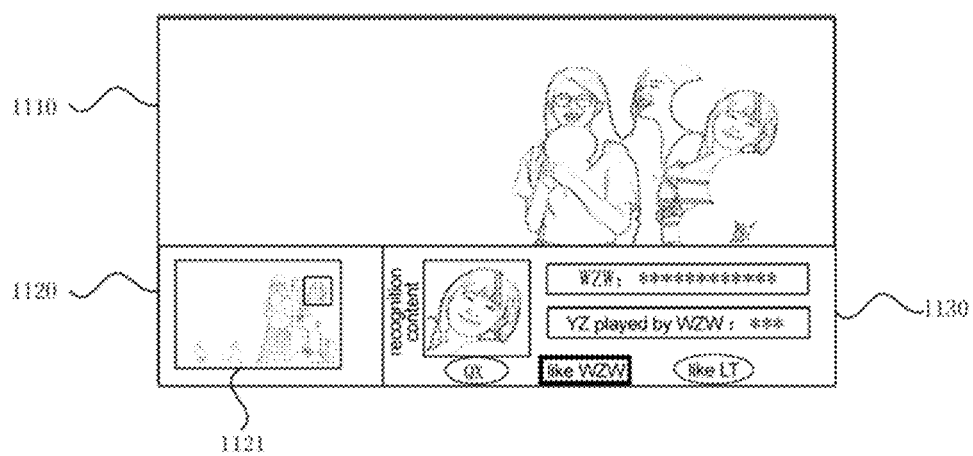

For another example, in the user interface shown in FIG. 8f, when the focus frame for content selection falls on the control of "Like WZW", the content profile related to the keyword "WZW", a name "YZ" of a role played by "WZW" in the current play content, and content profile of "YZ" are displayed in the area for displaying the recognition content. In other words, in addition to profile information including the character, the profile information in the recognition result also includes role profile information about the character in the video.

In some embodiments, after object recognition is completed and the character name is obtained, a cast list corresponding to the video is obtained based on a video identifier in a request for recognition, then a role name corresponding to the object is determined based on the character name and the cast list, then the role introduction information is determined based on the role name, and the role name and the role introduction information are taken as a part of the recognition result.

In some embodiments, the role introduction information can be determined by a crawler, search engine, or database comparison. This is not restricted in specific implementation, provided that the role introduction information can be obtained.

In some embodiments, the user can set a quantity of recognition results that can be displayed in the area for displaying the recognition results through system settings, for example, no more than three recognition results. The user can adjust content displayed in the area for displaying the recognition results by adjusting a progress-bar control of the area for displaying the recognition results, for example, drag out a hidden recognition result and hide a displayed recognition result.

In some embodiments, display of the area for displaying the recognition content and/or the area for displaying option bars does not interfere with display of the area for displaying the current play content. In other words, when the area for displaying the recognition content and/or the area for displaying option bars is displayed, the user still can see content of the area for displaying the current play content. For example, the area for displaying the recognition content and/or the area for displaying option bars is transparent, so that the content displayed in the area for displaying the current play content can be seen through by the user. For another example, in response to a command for displaying of the area for displaying the recognition content and/or the area for displaying option bars, an area in which the current play content is displayed is scaled down to a size that is compatible with the area for displaying the recognition content and/or the area for displaying option bars, to serve as the area for displaying the current play content.

In some embodiments, in the area for displaying the recognition content, a plurality of recognition results is arranged in a descending order based on the similarity to the corresponding objects. For example, in the user interface shown in FIG. 8a, the recognition result of the object A is displayed first, the recognition result of the object C is displayed in the middle, and the recognition result of the object B is displayed at the end.

In the foregoing embodiments, after the display apparatus receives a user input for triggering image recognition, the recognition results corresponding to a plurality of objects in the target image are displayed at the same time. When the similarity between the recognition result and the corresponding object does not fall within the predetermined range, the recognition result is displayed in association with the similarity indication information. The similarity indication information is used to indicate the similarity between the recognition result and the corresponding object. In this way, it can be ensured that sufficient recognition results are displayed to the user by lowering the similarity threshold. Meanwhile, displaying the similarity indication information in association with the recognition result, allows the user to know the accuracy of the recognition result of each object.

In some scenarios, the user may want to obtain the name of an actor/actress that is corresponded to a face in a screenshot. In some scenarios, the user may want to obtain a name of a role that is corresponded to a face in a screenshot. In this case, regarding how to recognize different recognition intentions of the user, the disclosure provides an implementation. In this embodiment, both the name of the actor and the name of the role can be further optimized by using similarity information.

Figure 9:
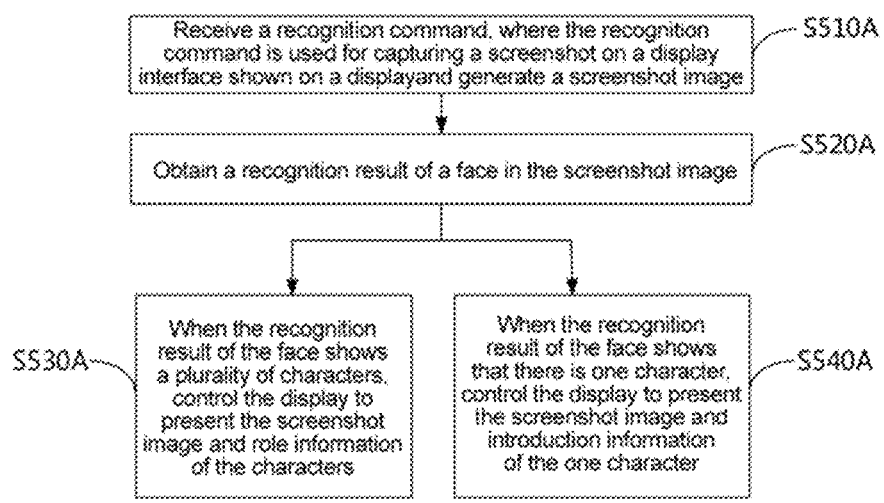
FIG. 9 is a schematic flowchart of a method for displaying a character profile according to some embodiments of the present disclosure.

Refer to FIG. 9, which is a schematic flowchart of a method for displaying a character profile according to some embodiments of the present disclosure. As shown in FIG. 9, the method includes the following steps.

S510A: Receive a recognition command, where the recognition command is used for capturing a screenshot on a display interface shown on a display of the display apparatus and generate a screenshot image.

In an embodiment of the present disclosure, when watching a media resource shown on the display, if a user wants to learn more information about a character in the play, the user can issue a recognition command to the display apparatus 200. In other words, after turning on the display apparatus, when the user is more interested in a character in a display interface that is currently shown on the display, the user can also issue a recognition command to the display apparatus 200. In other words, after receiving the recognition command, the display apparatus 200 can determine information about the character in the current display interface of the display based on the recognition command, where the information is what the user wants to know.

In an embodiment, there is a "screenshot" button on a remote control. Alternatively, a particular button on the remote control is bound with a screenshot capturing function, for example, a favorites button or a broadcasting button is bound with the screenshot capturing function. When watching a media resource, if the user wants to learn a character in a display interface displayed on the display, the user can send a recognition command through the "screenshot" button or the particular button bound with the screenshot capturing function on the remote control. After the recognition command sent through the button on the remote control is received, a controller instantly performs screenshot capturing on the current display interface, to generate the screenshot image.

In another embodiment, the user can send a recognition command through voice input. For example, the user long presses a button for voice input on the remote control and says "who is that". After receiving the voice input from the user, the controller first uploads voice input information of the user to a server 300. The server 300 parses the voice input information, and returns an authorization instruction to the display apparatus 200 when the voice input information is parsed as that the user wants to know the character in the display interface. The display apparatus 200 performs screenshot capturing on the current display interface of the display based on the authorization instruction. When the voice input information is parsed and it is determined that the voice input information is not related to learning character information from the currently-displayed content, no authorization instruction is returned to the display apparatus 200. In this case, the controller does not perform a screenshot capturing operation.

In this embodiment of the present disclosure, the controller receives the recognition command sent via a screenshot button on the remote control or through voice input, and performs screenshot capturing on the display interface shown on the display based on the recognition command, so as to generate the screenshot image. The screenshot image may be a frame of image in the media-resource video watched by the user, or may be an image in the current display interface of the display, such as a display interface under a television channel.

S520A: Obtain a recognition result of a face in the screenshot image.

In some embodiments, the controller sends the screenshot image that is generated based on the recognition command to the server 300, and the server 300 recognizes a character in the screenshot image. After sending the screenshot image to the server 300, the controller sends a request for obtaining the recognition result to the server 300. After receiving the request for obtaining the recognition result, the server 300 recognizes face information in the screenshot image based on the request. Since the user wants to know a main actor rather than a lot of extras, a condition for facial recognition can be added, thereby reducing a calculation amount of the server 300.

In an implementation, because the main actor is generally close to a camera, a face area thereof is larger than a face area of the extra. Considering that in the current screenshot image, if an actor is located at an edge of the image, and only a half the face of the actor is displayed, a face area thereof is also relatively small. On this basis, the face is recognized merely when the face area in the screenshot image is larger than a preset area. In this way, the server 300 no longer recognizes face information of a character with a small face area, so that part of the calculation amount is reduced.

In another implementation, if a size of the face area of the character in the screenshot image ranks in the first few places, the character is recognized. In other words, the server 300 only recognizes a character whose face area ranks in the first few places in the screenshot image. For a character whose face area ranks in the last few places, a face area thereof is relatively small, and a corresponding character may be an unimportant role such as an extra. Therefore, there is no need for the server 300 to recognize face information of the character whose face area ranks in the last few places.

In another implementation, a face located in a center region of the screenshot image is recognized. In each screenshot image, the character located in the center region of the screenshot image is usually a main character. Therefore, the server 300 can only recognize face information of the character located in the center region of the screenshot image.

In view of the above, the calculation amount of the server 300 can be reduced through added auxiliary conditions for recognition. This helps the server 300 to quickly obtain the recognition result for the face in the screenshot image based on the request for obtaining the recognition result.

In some other embodiments, after obtaining the screenshot image based on the recognition command, the controller sends a time stamp corresponding to the screenshot image to the server 300, so that the server 300 recognizes an image frame corresponding to the screenshot image based on the time stamp and performs facial recognition based on the image frame. When the screenshot image is received by the controller, based on a timing of the played media resource, the screenshot image is correlated to one time stamp in the media resource. Based on the time stamp, the server 300 can obtain the screenshot image from corresponding media resource data. The controller sends the time stamp to the server 300, and the server 300 confirms the image frame corresponding to the screenshot image based on the time stamp. The server 300 further recognizes the face information in the screenshot image based on the request for obtaining the recognition result that is sent from the controller.

In the embodiments of the present disclosure, after recognizing the face information, the server 300 obtains the recognition result and further sends the recognition result to the display apparatus 200. The controller receives the recognition result sent from the server 300. In the recognition result, according to a quantity of characters in a facial recognition result, the screenshot image is divided into two categories, which respectively are a multi-character scenario and a single-character scenario.

S530A: When the recognition result of the face shows a plurality of characters, control the display to present the screenshot image and role information of the characters.

When the recognition result shows that a plurality of characters is in the screenshot image, that is, it is a multi-character scenario, the server 300 recognizes face information of the plurality of characters in the screenshot image, that is, recognizes the plurality of characters in the screenshot image. In this scenario, the user is more likely to want to know introduction information of multiple roles, in a film and television program, in the screenshot image. The role information of the characters refers to the introduction information of the characters in the film and television program, including name of the roles, introductions to the roles, relationships with other roles, and the like. After recognizing the plurality of characters, the server 300 obtains the name of each character and a cast list of a media source corresponding to the display interface, and then determines a role name of the character based on the name and the cast list. The server 300 obtains the role information of the character based on the role name. For example, the introductions to various roles and the relationships among the roles can be obtained based on corresponding score information on the media resource or a brief description of the media resource. Finally, the server 300 feeds the role information back to the controller. The controller controls the display to present the role information while displaying the screenshot image.

Figure 10A:
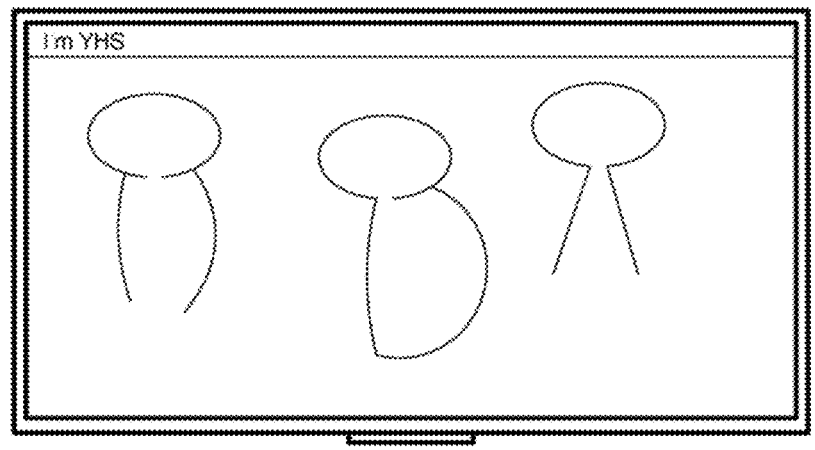
FIG. 10a shows an interface during screenshot capturing in a multi-character scenario according to some embodiments of the present disclosure.
Figure 10B:
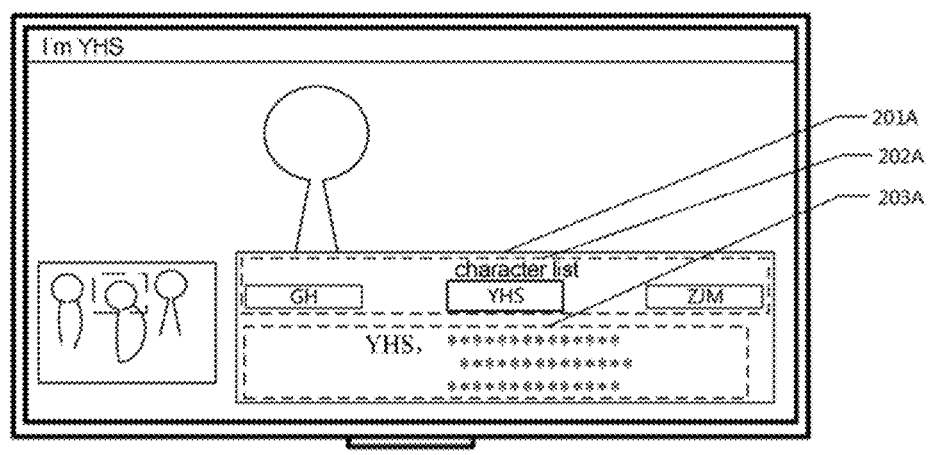
FIG. 10b shows a view of displaying role information in a multi-character scenario according to some embodiments of the present disclosure.

According to some implementations, FIG. 10a shows an interface during screenshot capturing in a multi-character scenario according to some implementations of the present disclosure. FIG. 10b is a diagram of displaying role information in a multi-character scenario according to some implementations of the present disclosure. With reference to FIG. 10a and FIG. 10b, an example in which "I Am YHS" is played on the display is used, the screenshot image obtained by the controller includes at least three (or more) roles of YHS, GH, and ZJM. After the face information in the screenshot image is recognized by the server 300, three characters are recognized, which respectively are GJF, GL, and YY. Correspondingly, the role, in a film and television series, of each character in the screenshot image is obtained based on a cast list of the film and television series, or a preset media resource database, or an introduction information database. Subsequently, three pieces of role information are further obtained from the preset media resource database or the introduction information database, respectively. For example, the role information of the character may include: YHS is a salesman with the worst performance in the company; YHS hasn't changed until his wife GH who thought he was useless and filed for divorce; ZJM is the leader of YHS; and the like. The server 300 sends the role information of the characters to the controller. The controller controls the display to present the screenshot image and the role information of each character. In the embodiments of the present disclosure, the controller controls display of an information floating layer in a current interface of the display. The information floating layer includes a plurality of introduction controls and introduction display areas, for displaying the role information. As shown in FIG. 10b, a character list 202A and a corresponding introduction display area 203A are displayed on an information floating layer 201A. The character list 202A includes introduction controls corresponding to a plurality of characters in the screenshot image. In the current information floating layer 201A, the introduction control corresponding to YHS is selected. Therefore, the role information of YHS is displayed in the introduction display area 203A. The user inputs a command for switching between objects via a remote control, for example, moves a focus to the character list 202A, and uses the left/right buttons on the remote control to move the focus to the introduction control corresponding to GH or ZJM. In this case, the role information of GH or ZJM is correspondingly displayed in the introduction display area 203A. The information floating layer 201A is further configured to display the introduction information of the character. For example, it may be that only the introduction control corresponding to YHS is displayed in the character list 202A, and only the introduction information of GJF is displayed in the introduction display area 203A. It should be noted that when the information floating layer 201A displays the role information or the introduction information, the corresponding screenshot image can be set as a background image and be floated below text, or the corresponding screenshot image can be placed on one side of the information floating layer 201A.

In some embodiments, a highlight box control disposed on the floating layer can also be included. The highlight box control is above the screenshot image in the information floating layer 201A, and a position of the highlight box control corresponds to a name of a role where the focus is located. When the focus is on a role-information control for "YHS", the highlight box control is above the role of YHS in the screenshot image. When the focus moves to a role-information control for "GH", the highlight box control is above the role of GH in the screenshot image, so that the user can better understand corresponding image of each character in the screenshot image and the introduction information of the role.

In some embodiments, after the image recognition is completed, the server 300 maps an image recognition result and a face position corresponding to the image recognition result in the screenshot image. A way of mapping may be mapping the image recognition result and a position coordinate of the face in the screenshot image; or may be mapping the image recognition result and a frame-shaped control when the frame-shaped control is preset on a face in the screenshot image. Regarding a role-information control drawn by the display based on the image recognition result, after the role-information control is selected, the highlight box control is displayed above the face in the screenshot image through the mapped coordinates or the corresponding frame-shaped control is set to highlighted state through the mapping between the image recognition result and the frame-shaped control.

In some embodiments, after the recognition result and the role information that are fed back from the server 300 is received by the display apparatus 200, which display manner of the foregoing floating layer or a split-screen display manner is used is determined based on an identifier of a television. The identifier of the television indicates that the display apparatus includes only one display. Some display apparatuses have two or more display screens, and the such display apparatus may include a primary display and a secondary display. The display manner of the foregoing floating layer is used when an identifier of the display apparatus indicates that only one display is included, and split-screen display is performed when the identifier indicates that the display apparatus is a display apparatus with two screens.

Figure 10C:
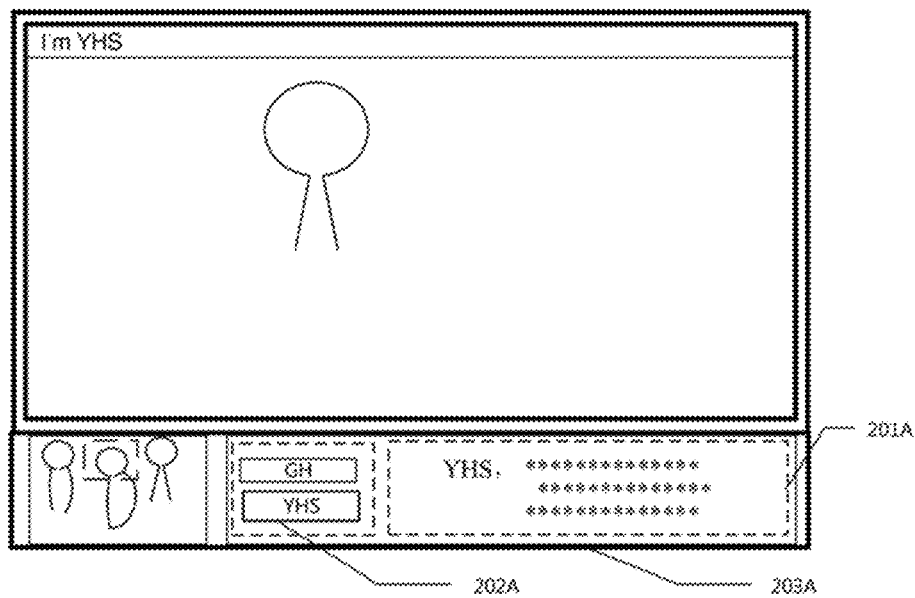
FIG. 10c shows a view of displaying role information in another multi-character scenario according to some embodiments of the present disclosure.

According to some embodiments, FIG. 10c is a diagram of role information display in another multi-character scenario according to some embodiments of the present disclosure. As shown in FIG. 10c, the controller can control the primary display to play a media resource, and the role information or the introduction information is displayed on the secondary display. According to this display manner, viewing of the media resource by the user is not affected while the role information or the introduction information is displayed to the user.

In some embodiments, introduction controls in FIG. 10c can be arranged from top to bottom in a form of a list. To adapt to a size of the secondary display, it can be configured that a set quantity of introduction controls is displayed. After an operation of moving the focus downward or upward is received via the introduction control, based on a sorting order of the introduction control, an introduction control displayed on a secondary screen is refreshed and an introduction control where the focus is located is moved. Meanwhile, information in 203A is updated based on the position of the focus. For example, when only two introduction controls are displayed, the upper introduction control is an introduction control for "GH", and the lower introduction control is an introduction control for "YHS". When the focus is on the introduction control for "YHS", if an operation associated with downward button on the remote control is received, it is determined there is a next control based on the sequence of the introduction controls. Moreover, if the next control is an introduction control for "ZJM", a list of controls is adjusted, so that the introduction control for "YHS" is displayed at an upper position of the list of controls, the introduction control for "ZJM" is displayed at a lower position, and role information of "ZJM" is updated at a position of 203A. If it is determined that there is no next introduction control based on the sequence of the introduction controls, a prompt message pops up to remind the user that there is no other introduction control.

In some embodiments, the introduction control for "GH", the introduction control for "YHS", and the introduction control for "ZJM" can be replaced with a first introduction control, a second introduction control, and a third introduction control.

In some embodiments, play of video content is continued during screenshots and information displaying. For example, a timing when the television receives a screenshot command is T 1, and a timing when the screenshot and information are displayed is T2, the television program continues playing according to a normal play progress between T1 and T2, thereby avoiding disruption to the viewing process of the user.

In some embodiments, the user can customize the settings. It is still that the information floating layer pops up on the primary display, for displaying the role information, and the secondary display only displays information such as time, weather, or an alarm clock.

In some embodiments, the primary display and the secondary display are two displays on the display apparatus. The two displays are displayed independently, where independent display means that the two displays are controlled by independent control units. For example, display positions of controls on the two displays cannot be exchanged by changing coordinates.

S540A: When the recognition result of the face shows that there is one character, control the display to present the screenshot image and introduction information of the one character.

Figure 10D:
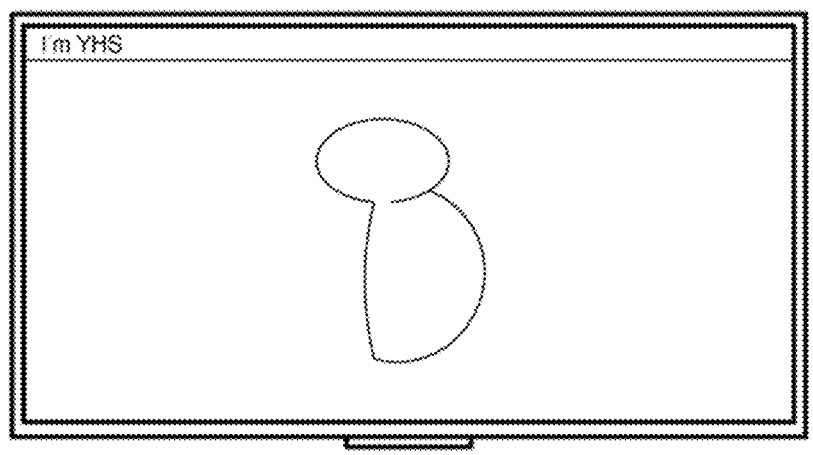
FIG. 10d shows an interface during screenshot capturing in a single-character scenario according to some embodiments of the present disclosure.
Figure 10E:
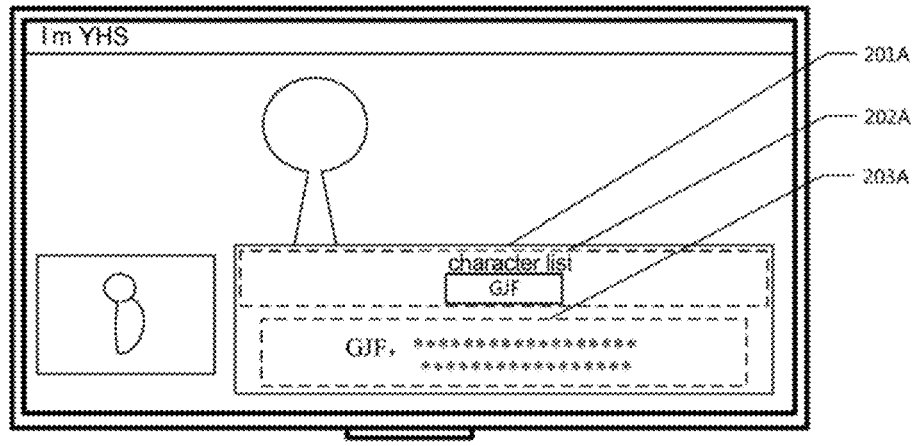
FIG. 10e shows a view of displaying profile information in a single-character scenario according to some embodiments of the present disclosure.

In some embodiments, for example, an interface displayed when a screenshot capturing command is received is shown in FIG. 10d. When the recognition result is that there is one character, that is, it is a single-character scenario, a display effect of the display apparatus 200 is shown in FIG. 10e, and the introduction information of the character is displayed.

In some embodiments, the server 300 recognizes face information of a character in the screenshot image, that is, a character in the screenshot image is recognized. In this scenario, it is considered that what the user wants to know more is introduction information of the character. For example, for introduction information of YHS in the play of "I am YHS", only one piece of face information, that is, a face corresponding to YHS, is recognized in a screenshot image obtained by the controller. By comparing with a face image in the preset media resource database or with a face in the introduction information, it can be learned that a character corresponding to the face is GJF. The introduction information of the character can include: GJF, profile information about GJF. The server 300 feeds the introduction information of GJF back to the controller. The controller controls the display to present the screenshot image and the introduction information of the character.

In some embodiments, while feeding back the introduction information of the character or role information of the character, the server 300 also feeds back an image identifier corresponding to the screenshot image. Thus, the display apparatus 200 can invoke the screenshot image from a cache thereof, thereby avoiding delay of network transmission.

In the present disclosure, according to a quantity of characters in the screenshot image, the screenshot image is divided into a multi-character scenario and a single-character scenario. In the multi-character scenario, the user may want to know more about the information about the roles of the characters in the film and television program; and in the single-character scenario, the user wants to know more about the introduction information about the current character. In this way, when the user wants to know the character in the display interface displayed on the display, different character information in different scenarios can be quickly obtained by sending the recognition command to the display apparatus, thereby improving viewing experience of the user.

Figure 11:
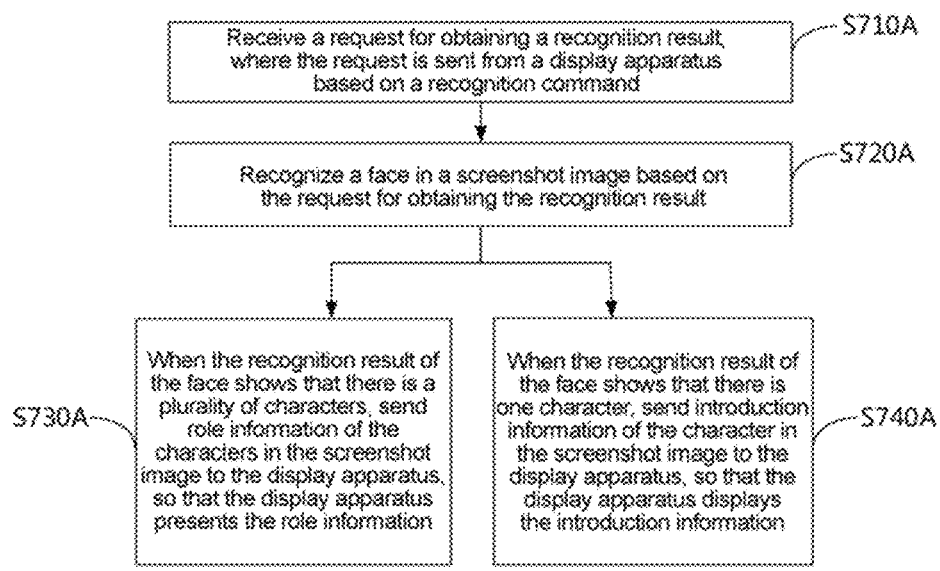
FIG. 11 is a schematic flowchart of a method for processing character recommendation and profile according to some embodiments of the present disclosure.

The server is configured to implement a method for recommending character introduction. Refer to FIG. 11, FIG. 11 is a schematic flowchart of a method for processing character recommendation and introduction according to some embodiments of the present disclosure. With reference to FIG. 11, a configuration process of the server includes the following steps.

S710A: Receive a request for obtaining a recognition result, where the request is sent from a display apparatus based on a recognition command.

In this embodiment of the present disclosure, the display apparatus 200 needs to perform screenshot capturing on a display interface shown on a display and generate a screenshot image after receiving the recognition command. If the display apparatus 200 wants to obtain information about a character in the screenshot image, a purpose of obtaining the recognition result in the server 300 can be achieved by sending the request for obtaining the recognition result to the server 300.

In some embodiments, if the recognition command is sent to the display apparatus from the user through voice input, the server is also configured to: receive and parse voice input information sent from the display apparatus; send an authorization instruction to the display apparatus when the voice input information is parsed and determined as the user wants to know a character in a media resource, so that the display apparatus performs screenshot capturing on a display interface shown on the display based on the authorization instruction; and not send an authorization instruction to the display apparatus when the voice input information is parsed and determined as not for knowing character information, so that the controller does not perform a screenshot capturing operation.

S720A: Recognize a face in a screenshot image based on the request for obtaining the recognition result.

In this embodiment of the present disclosure, before receiving the request for obtaining the recognition result, in an implementation, the server 300 can receive the screenshot image sent from the display apparatus 200. After generating the screenshot image based on the recognition command, the display apparatus 200 can directly upload the screenshot image to the server 300, so that the server 300 recognizes the character in the screenshot image. In another implementation, a time stamp corresponding to the screenshot image that is sent from the display apparatus 200 can be received. When the screenshot image is obtained, the display apparatus 200 can send the time stamp corresponding to the screenshot image to the server 300. The server 300 obtains an image frame corresponding to the screenshot image in a corresponding media resource based on the time stamp.

Certainly, the time stamp corresponding to the screenshot image can also be included in the request for obtaining the recognition result. To be specific, when sending the request for obtaining the recognition result, the display apparatus 200 also sends the time stamp corresponding to the screenshot image to the server 300. After receiving the request for obtaining the recognition result, the server 300 first obtains the image frame based on the time stamp, and then recognizes a face in the image frame. It should be noted that when obtaining the image frame based on the time stamp, the server 300 can obtain multiple frames of images that are consecutive in time periods before and after the time stamp, so as to avoid the problem that a key image frame may be ignored caused by a time difference in a process during which the user finishes sending of the recognition command through voice input and the display apparatus starts screenshots capturing. Therefore, by obtaining multiple frames of images, it is ensured that valid information is obtained.

In another implementation, after generating the screenshot image, the display apparatus 200 can directly uploads the screenshot image to the server 300. The server 300 further performs facial recognition on the screenshot image based on the request for obtaining the recognition result.

Figure 12:
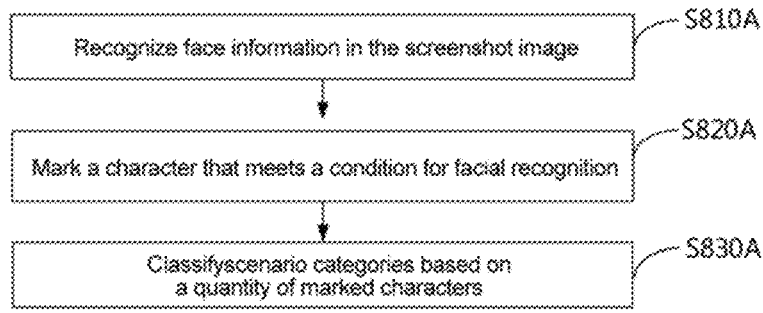
FIG. 12 is a schematic flowchart of recognizing a role in a screenshot image according to some embodiments of the present disclosure.

After obtaining the screenshot image, the server 300 recognizes one or more character in the screenshot image based on the request for obtaining the recognition result sent from the display apparatus 200. Referring to FIG. 12, FIG. 12 is a schematic diagram of a process of a recognizing a character in a screenshot image according to some embodiments of the present disclosure. As shown in FIG. 12, the recognition process is as follows.

S810A: Recognize face information in the screenshot image.

In this embodiment of the present disclosure, the server can recognize a face region in the screenshot image, to mark the face information in the screenshot image.

S820A: mark a character that meets a condition for facial recognition.

In an embodiment, because a main actor is generally close to a camera, a face area thereof is larger than a face area of an extra. Considering that in the current screenshot image, if an actor is located at an edge of the image, and only a half face of the actor is displayed, a face area thereof is also relatively small. In view of the above factors, the face is recognized merely when the face area in the screenshot image is larger than a preset area. In this way, the server 300 no longer recognizes face information of a character with a small face area, so that a part of the calculation amount is reduced.

In another embodiment, if a size of the face area of the character in the screenshot image ranks in the first few places, the character is recognized. In other words, the server 300 only recognizes a character whose face area ranks in the first few places in the screenshot image. For a character whose face area ranks in the last few places, a face area thereof is relatively small, and a corresponding character may be an unimportant role such as an extra. Therefore, there is no need for the server 300 to recognize face information of the character whose face area ranks in the last few places.

In another embodiment, a face located in a middle region of the screenshot image is recognized. In each screenshot image, the character located in the middle region of the screenshot image is usually a main character. Therefore, the server 300 can only recognize face information of the character located in the middle region of the screenshot image.

In view of the above, the calculation amount of the server 300 can be reduced through the condition for facial recognition that is added in this embodiment of the present disclosure, that is, the face area in the screenshot image is larger than the preset area, or the size of the face area in the screenshot image ranks top three, or the face is located in the middle region of the screenshot image. This helps the server 300 to quickly mark the face in the screenshot image based on the request for obtaining the recognition result.

S830A: Classify scenario categories based on a quantity of marked characters.

In this embodiment of the present disclosure, after the face in the screenshot image is marked by the server 300, based on the quantity of the marked characters in the facial recognition result, the screenshot image is divided into two categories, which respectively are a multi-character scenario and a single-character scenario.

A process in which the server recognizes the character in screenshot image is described in the foregoing steps S810A to S830A. The server 300 is divided into a multi-character scenario and a single-character scenario based on the quantity of the marked characters.

S730A: When the recognition result of the face shows that there is a plurality of characters, send role information of the characters in the screenshot image to the display apparatus, so that the display apparatus presents the role information.

Figure 13:
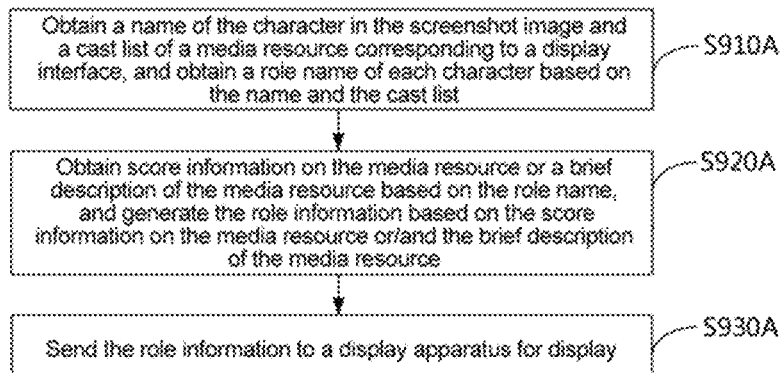
FIG. 13 is a schematic flowchart of obtaining role information about a character in a screenshot image according to some embodiments of the present disclosure.

Refer to FIG. 13, FIG. 13 is a schematic diagram of a process of obtaining role information of a character in a screenshot image in a server in FIG. 11 according to some embodiments of the present disclosure. As shown in FIG. 13, the process of obtaining the role information of the character is described in steps S910A to S930A. Specific steps are as follows.

S910A: Obtain a name of the character in the screenshot image and a cast list of a media resource corresponding to a display interface, and obtain a role name of each character based on the name and the cast list.

According to an embodiment of the present disclosure, when one or more characters in the screenshot image are marked, the name of each character and the cast list of the media resource are further obtained. The role name of each character can be obtained based on the name and the cast list. For example, in the play "I am YHS", it is recognized that GJF is included in the screenshot image, and introduction information of GJF and a cast list of "I Am YHS" are obtained. In this way, it is obtained that the role of YHS in "I Am YHS" is acted by GJF.

S920A: Obtain score information on the media resource or a brief description of the media resource based on the role name, and generate the role information based on the score information on the media resource or/and the brief description of the media resource.

In this embodiment of the present disclosure, after the role name of each character in the screenshot image is obtained, introductions to various roles and relationships among the roles can be obtained based on the corresponding score information on the media resource or the brief description of the media resource. For example, in the play "I Am YHS", it is recognized that YHS is acted by GJF, GH is acted by GL, and ZJM is acted by YY. The server 300 can obtain introductions to the roles of YHS, GH, and ZJM respectively based on the score information on the media resource or the brief description of the media resource of "I Am YHS", and can obtain the relationships among the roles.

S930A: Send the role information to the display apparatus for display.

In this embodiment of the present disclosure, the role information includes the role name, the introduction to the role, and the relationship between the roles. After obtaining the role information, the server 300 sends the role information to the display apparatus 200, so that the controller places the role information in an information floating layer and displays the same on the display, or places the role information in a secondary display for display.

S740A: When the recognition result of the face shows that there is one character, send introduction information of the character in the screenshot image to the display apparatus, so that the display apparatus displays the introduction information.

Figure 14:
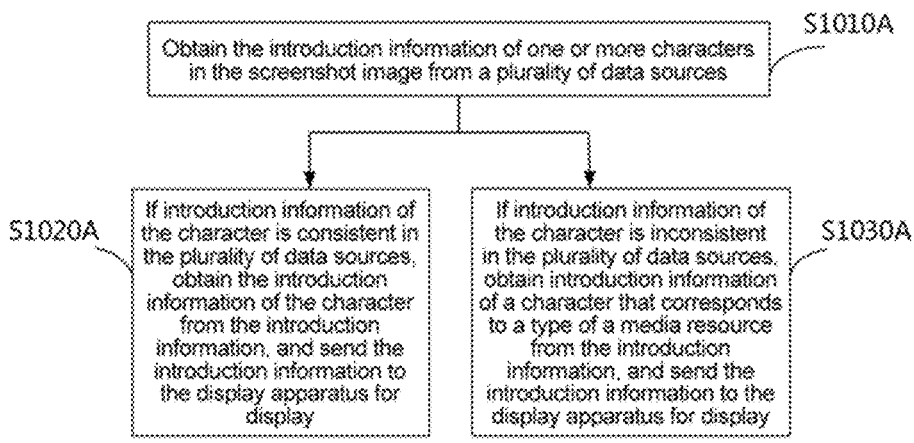
FIG. 14 is a schematic flowchart of obtaining profile information about a character in a screenshot image according to some embodiments of the present disclosure.

Refer to FIG. 14, FIG. 14 is a schematic diagram of a process of obtaining introduction information of a character in a screenshot image in a server in FIG. 11 according to some embodiments of the present disclosure. As shown in FIG. 14, the process of obtaining the introduction information of the character is described in steps S1010A to S1030A. Specific steps are as follows.

S1010A: Obtain the introduction information of one or more characters in the screenshot image from a plurality of data sources.

In an embodiment of the present disclosure, when the server 300 marks that there is only one character in the screenshot image, what the user wants to know more is current introduction information of an actor playing the character. The introduction information of the character is obtained by the server 300 based on the image. Therefore, it is inevitable that there are people who look alike. Alternatively, when a name of the character is recognized and introduction information is obtained based on the name of the character, it is inevitable that there are people using a same name. Therefore, for the character in the screenshot image, according to the present disclosure, the introduction information of the character can be obtained from a plurality of data sources. The data source can be BD Encyclopedia, Interactive Encyclopedia, or the like.

S1020A: If introduction information of the character is consistent in the plurality of data sources, obtain the introduction information of the character from the introduction information, and send the introduction information to the display apparatus for display.

In this embodiment of the present disclosure, when the introduction information of the character in the screenshot image is consistent among the plurality of data sources, that is, there is no one who looks alike or uses a same name with the character, the server 300 can directly obtain the introduction information of the character, that is, the introduction information of this character, and sends the same to the display apparatus 200, so that the controller places the introduction information in an information floating layer and displays the same on the display, or places the introduction information in a secondary display for display.

S1030A: If introduction information of the character is inconsistent in the plurality of data sources, obtain introduction information of a character that corresponds to a type of a media resource from the introduction information, and send the introduction information to the display apparatus for display.

In this embodiment of the present disclosure, when the introduction information of the character in the screenshot image is inconsistent in the plurality of data sources, that is, there may be someone who looks alike or uses a same name with the character, the server 300 needs to determine a type of a media resource currently viewed by the user, and select performance information based on the type of the media resource. For example, if the media resource is a film and television drama, the server 300 needs to select information containing relevant fields such as "artist", "movie", and "television drama". If the media resource is a documentary, the server selects information containing relevant fields such as "celebrity" and "documentary". After the introduction information corresponding to the type of the media resource is selected, the introduction information is sent to the display apparatus 200, so that the controller places the introduction information in an information floating layer for display on the display, or places the introduction information in a secondary display for display.

The server provided in the present disclosure can obtain a quantity of characters in the screenshot image based on a quantity of recognized faces, so as to divide the screenshot image into a multi-character scenario and a single-character scenario, and respectively sends different character introductions to the display apparatus in different scenarios. In this way, the user can learn about the character in the media resource based on different character information in different scenarios, where the different character information is sent to the display apparatus from the server. Thus, viewing experience of the user is improved.

An embodiment of the present disclosure further provides a method for displaying character introduction. The method includes: receiving a recognition command, where the recognition command is used to perform screenshot capturing on a display interface displayed on a display and generate a screenshot image; obtaining a recognition result of a character in a screenshot image; when a recognition result of a face shows that there are a plurality of characters, controlling the display to present the screenshot image and role information of the characters; and when the recognition result of the face shows that there is one character, controlling the display to present the screenshot image and introduction information of the character.

In an embodiment, after generating the screenshot image, the controller in the display apparatus can send the screenshot image to the server, and the server further recognizes a face in the screenshot image, and feeds a recognition result back to the controller. The controller receives the recognition result of the face in the screenshot image sent from the server. In another embodiment, after generating the screenshot image, the controller in the display apparatus can send a time stamp corresponding to the screenshot image to the server. The server determines an image frame corresponding to the screenshot image based on the time stamp and performs facial recognition based on the image frame. After the face information is recognized, the recognition result is fed back to the controller, and the controller receives the recognition result of the face that is sent from the server.

In some embodiments, in addition to requirements on recognition of actors and roles, the user is also interested in an item shown in a video. An item in a screenshot can be recognized to view whether there are similar commercial items for sale through comparison.

Figure 15A:
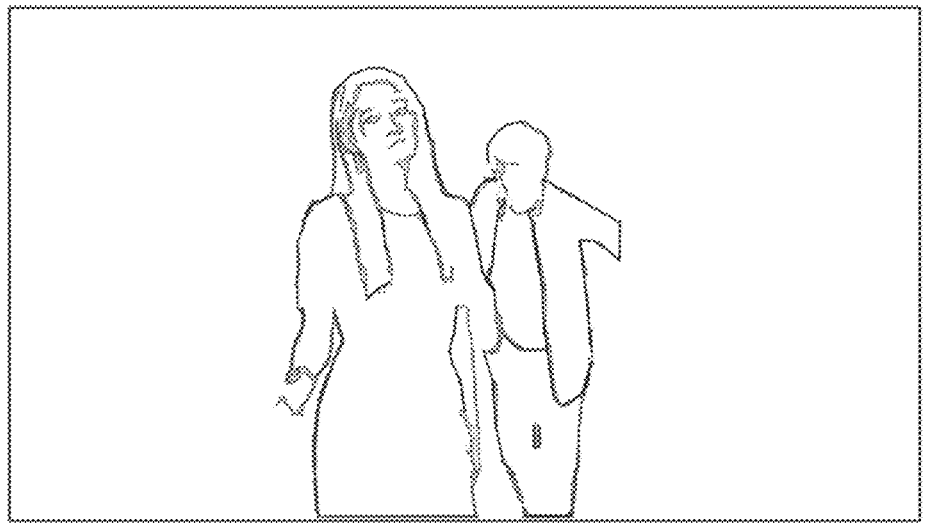
FIG. 15a to FIG. 15c show a user interface according to some embodiments of the present disclosure.

FIG. 15a is a schematic diagram of a user interface shown in some embodiments of the present disclosure. As shown in FIG. 15a, a video is played in full screen on a display. When a display apparatus plays a video program, screenshot capturing and recognition of a screenshot image can be triggered in various ways such as buttons of a remote control, soft buttons on a touch screen, voice commands, and gestures.

Figure 15B:
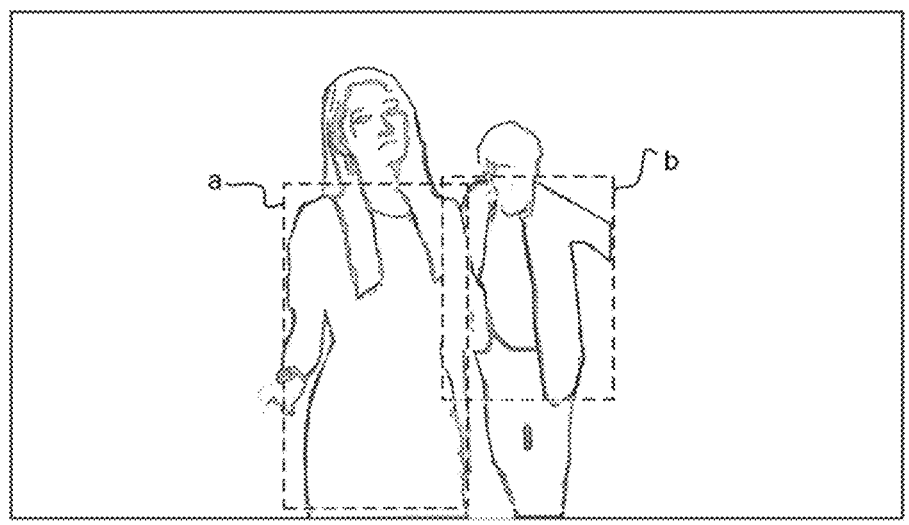

In some embodiments, the recognition of the screenshot image may be recognition of an item in the image. As shown in FIG. 15b, a and b in FIG. 15b represents commercial objects to be recognized. After user input for triggering screenshot capturing is received, a recognition result obtained by recognizing the commercial object in the screenshot image is displayed.

Figure 15C:
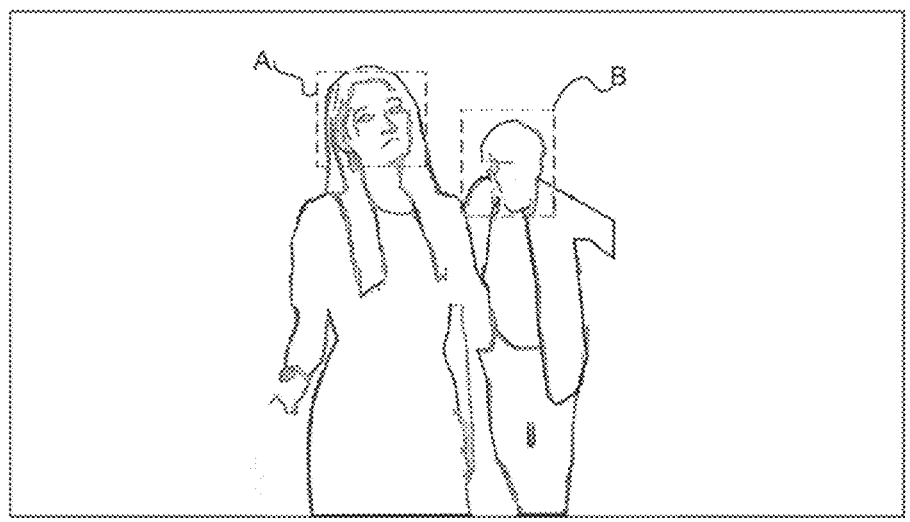

In some embodiments, the recognition of the screenshot image may be recognition of a character in the image, such as facial recognition. As shown in FIG. 15c, A and B represent character objects for recognition. After the user input for triggering screenshot capturing is received, a recognition result obtained by recognizing the character object in the screenshot image is displayed.

According to some embodiments, when the video play image as shown in FIG. 15a is displayed, if the user input for triggering screenshot capturing is received, in response to the user input, a screenshot image of the video image that is currently played is obtained through screenshot capturing, and commercial item information obtained by performing image recognition on the commercial object in the screenshot image is displayed, that is, commercial item information matching with the commercial object in the screenshot image is displayed.

In some embodiments, when the commercial item information matching with the commercial object in the screenshot image is displayed, character information obtained by performing image recognition on the character object in the screenshot image can also be displayed.

In some embodiments, to display commercial item information without affecting the user to continue watching play content, while continuing playing the current play content, the commercial item information is displayed in a local area on an upper layer of a layer for displaying the play content.

In some embodiments, the commercial item information that matches with the commercial object in the screenshot image is displayed in the upper layer of the current play content in a form of an option bar. The user can trigger display of more detailed commercial item information and/or a buying page by operating the option bar.

For example, if the user input for triggering screenshot capturing is received, a user interface including an area for displaying the current play content and an area for displaying recognition content is displayed. The current play content continues being displayed in the area for displaying the current play content, where the image may be an image for continuing play of current video content, or may be a frozen image displayed after the play of the current video content is paused. A plurality of option bars is displayed in the area for displaying the recognition content. At least one option bar in the plurality of option bars is configured to display the recognition result of the commercial object (such as an item or clothing) in the screenshot, that is, the commercial item information matching with the commercial object, such as a picture showing appearance and details of the commercial item, text for introducing the commercial item, a price of the sold item, and/or a buying link for skipping to the buying page. The other option bars can be configured to display a thumbnail of the screenshot image, a character recognition result of the character object in the screenshot, or text/images that represent the character recognition result, recommendation content related to the character or the commercial item recognition result (an object), and/or an operation control for functions associated with screenshot.

In an implementation scenario of recognizing the commercial object in the image, an image feature is first extracted, and then an item matching with the commercial object in the image is determined by matching the image feature with a feature database of commercial items. A recognition result of the commercial object in the image is the commercial item information corresponding to the matched commercial item.

In some embodiments, if it is recognized that the screenshot image contains a plurality of commercial objects, some commercial item recognition results or all commercial item recognition results can be displayed based on similarity between features of the commercial objects and the corresponding commercial items. For example, if the similarity between the recognized commercial item and the commercial object in the image is greater than a preset value, the commercial item information corresponding to the commercial item is displayed, or otherwise the commercial item information corresponding to the commercial item is not displayed.

In some embodiments, if it is recognized that the screenshot image contains a plurality of commercial objects, information of a first commercial item will be displayed preferentially. The first commercial item refers to a commercial item corresponding to a first commercial object in the screenshot image, and the first commercial object is one of the pluralities of commercial objects in the screenshot. It should be noted that similarity between the first commercial item and the first commercial object is higher than similarity between any other commercial item and the corresponding commercial object. For example, when it is recognized that there are two commercial objects, a bag and a coat, in the screenshot image, if similarity between the commercial object "bag" and a recognized commercial item "bag" is greater than that between the commercial object "coat" and a recognized commercial item "coat", commercial item information of the commercial item "bag" will be displayed.

For ease of description, the option bar for displaying the commercial item recognition result in the area for displaying the recognition content is referred to as a commercial-information option bar, and the option bar for displaying the character recognition result is referred to as a character-information option bar.

Figure 16A:
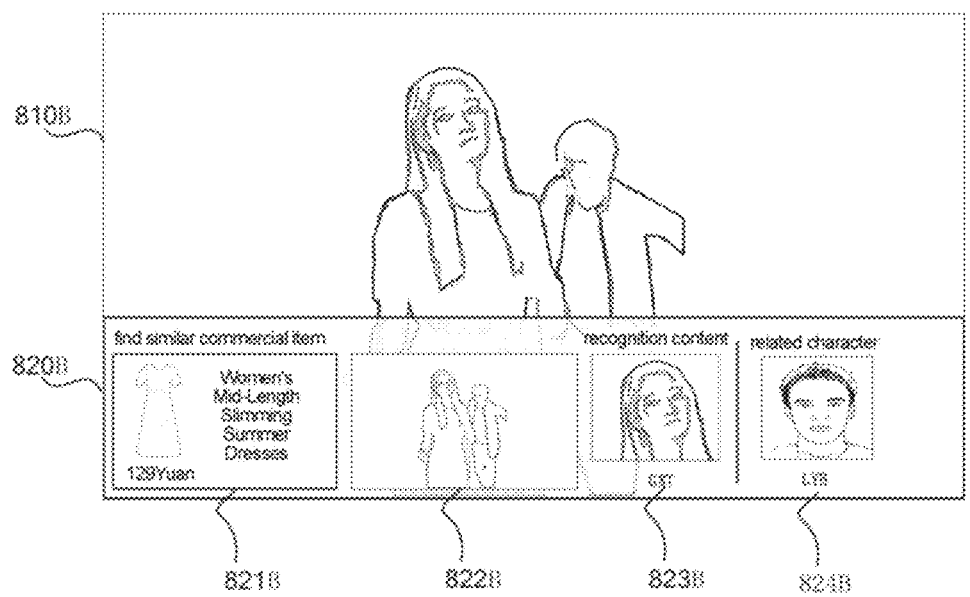
FIG. 16a to FIG. 16f show a user interface according to some embodiments of the present disclosure.

FIG. 16a is a schematic diagram of a user interface shown in some embodiments of the present disclosure. The user interface is specifically a user interface displayed after a screenshot capturing command is received when the image shown in FIG. 15a is displayed. As shown in FIG. 16a, the user interface includes an area 810B for displaying the current content and an area 820B for displaying recognition content. An image of a current play video continues being displayed in the area 810B for displaying the current content. A plurality of option bars is displayed in the area 820B for displaying the recognition content. The commercial item information that matches with the commercial object a in the screenshot image is displayed in a commercial-information option bar 821B, where the commercial item information is specifically a commercial item picture, a commercial item price "129 Yuan", and a title of the commercial item information "Women's Mid-Length Slimming Summer Dresses". The thumbnail of the screenshot image is displayed in an option bar 822B. The character information that matches with the character object A in the screenshot image is displayed in a character-information option bar 823B, where the character information is specifically a screenshot area (a face-area image) corresponding to the character object A and a character name "GXT". Related character information "LYB" of the character object A in the screenshot image and an image of the object A are displayed in an option bar 824B.

In some embodiments, a user-selected or pre-selected item, such as the commercial-information option bar or a function control, is indicated by using a focus frame for content selection. A display position of the focus frame for content selection can be moved in response to user input for moving a focus.

In some other embodiments, an object recognition focus frame is also displayed on the displayed thumbnail of the screenshot image. In different scenarios, the object recognition focus frame is displayed on different objects to highlight or identify the objects. For example, when only one object recognition result is displayed in the area for displaying the recognition content, the object recognition focus frame is displayed on an object corresponding to the object recognition result.

In some embodiments, a display position of the object recognition focus frame on the thumbnail is associated with the display position of the focus frame for content selection. In other words, the display position of the object recognition focus frame moves with movement of the focus frame for content selection, thereby ensuring that a character object or a commercial object framed out by the object recognition focus frame corresponds to the user-selected or the preselected recognition-result option bar. For example, if one or more option bars displaying object recognition-results are displayed in the area for displaying the recognition content, when the focus frame for content selection falls on the option bar displaying the object recognition-result, the object recognition focus frame is displayed on an object corresponding to the option bar where the object recognition focus frame is located.

In some embodiments, the object recognition focus frame cannot obtain the focus, and the focus frame for content selection can obtain the focus.

Figure 16B:
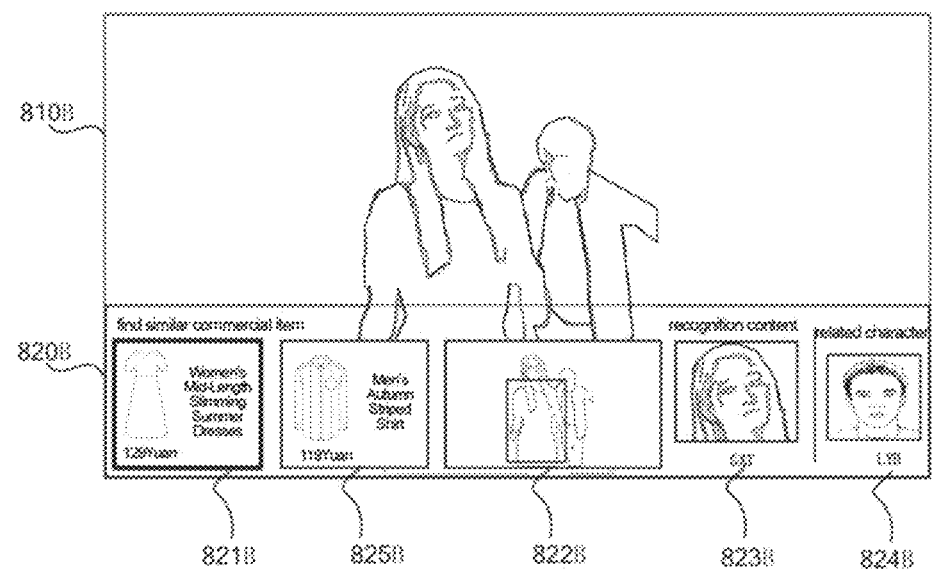
Figure 16C:
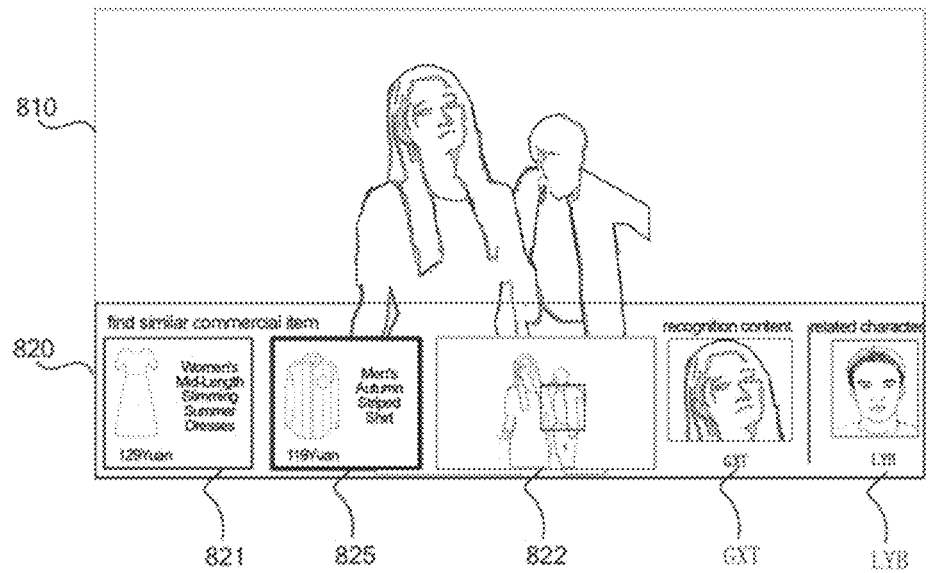

FIG. 16b is a schematic diagram of a user interface shown in some embodiments of the present disclosure. The user interface is specifically a user interface displayed after a screenshot capturing command input by a user is received when the image shown in FIG. 15a is displayed. Different from the user interface shown in FIG. 16a, commercial item information matching with a commercial object b in the screenshot image is also displayed in the area 820B for displaying recognition content. Specifically, a commercial item picture, a commercial item price "119 Yuan", and a title of the commercial item information "Men's Autumn Striped Shirt" are displayed in a commercial-information option bar 825B. In addition, as shown in FIG. 16b, an object recognition focus frame 822B1 is also displayed on the displayed thumbnail of the screenshot image. Moreover, because the focus frame for content selection falls on the commercial-information option bar corresponding to the commercial object a, the object recognition focus frame 822B1 is displayed around the commercial object a in the thumbnail, so as to frame out the commercial object a, thereby prompting the user that the commercial-information option bar currently selected by the user corresponds to the commercial object a in the screenshot image. As shown in FIG. 16c, when the focus frame for content selection is moved to the commercial-information option bar 825B, the object recognition focus frame is moved to a periphery of an area where the commercial object b is located.

It should be noted that, as shown in FIG. 16b and FIG. 16c, the object recognition focus frame can be a frame displayed around the area where the commercial object is located, and the focus frame for content selection can be a frame displayed around the option bar. It should be understood that, although the object recognition focus frame and the focus frame for content selection are shown in the form of frames in the specification of the present disclosure, the object recognition focus frame and the focus frame for content selection may also be other forms of icons that can identify the object and content selected by the user. For example, in addition to a square frame, the focus frame for content selection may also in other forms.

Figure 16D:
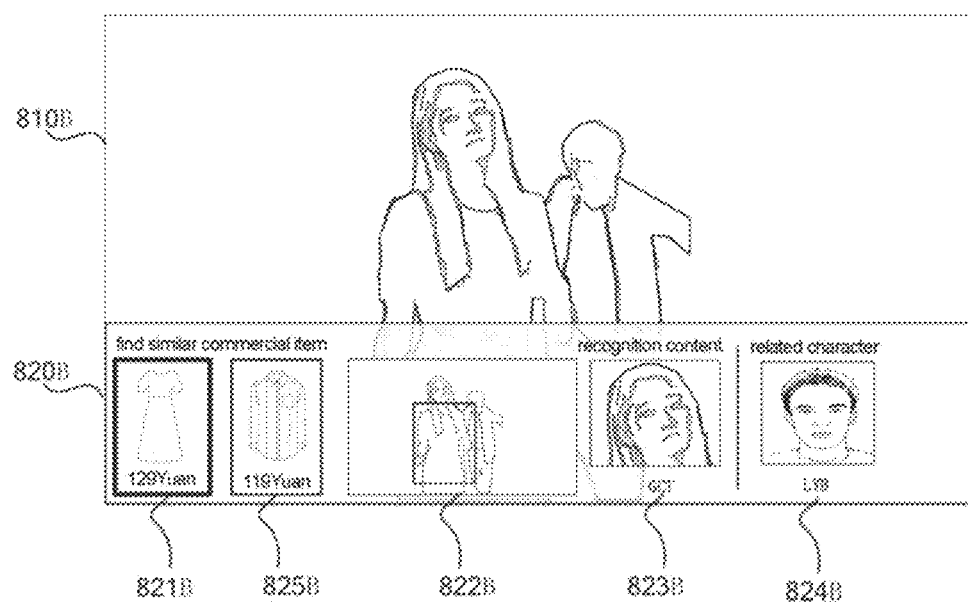

In some embodiments, the title of the commercial item information may not be displayed in the commercial-information option bar. For example, as shown in FIG. 16d, only the picture and the price of the commercial item are displayed in the commercial-information option bars 821B and 825B, thereby the user interface is simplified.

In some embodiments, the user can open the buying link in the commercial item information by operating the commercial-information option bar (for example, selecting the option bar and pressing a confirm button). In response to an operation of the commercial-information option bar, the display apparatus displays a commercial item information detail page on the upper layer of the current play image. The commercial item information detail page may contain more detailed commercial item information and controls for purchasing the commercial item.

Figure 16E:
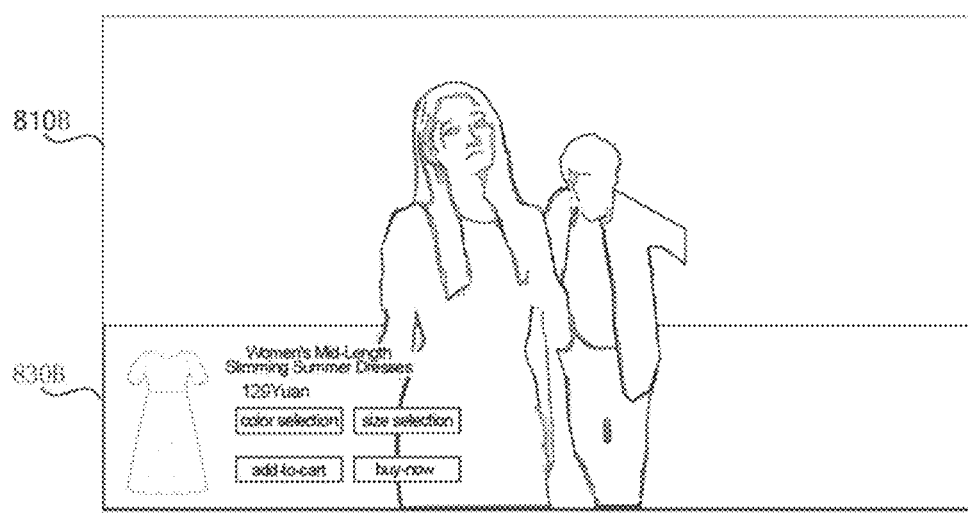

FIG. 16e is a schematic diagram of a user interface shown in some embodiments of the present disclosure. The user interface is specifically a user interface displayed after an operation of the commercial-information option bar 821B is received when the image shown in FIG. 16d is displayed. As shown in FIG. 16e, a commercial item information detail page 830B is displayed on the upper layer of the current play image. The commercial item information detail page 830B displays the commercial item picture, the title of the commercial item information "Women's Mid-Length Slimming Summer Dresses", the commercial item price "129 Yuan", a color selection control, a size selection control, an add-to-cart control, and a buy-now control.

In some embodiments, in response to receiving a command for capturing a screenshot, the display apparatus displays a control for displaying a commercial item, and in response to a selection of the control for displaying a commercial item, the display apparatus displays the commercial item information matching with the commercial object in the screenshot image.

In some embodiments, a target commercial item picture can be loaded via the control for displaying the commercial item.

In some embodiments, the target commercial item picture may be a picture in the commercial item information to be displayed, or may be an image comprising multiple pictures.

In some other embodiments, the target commercial item picture may be a partial picture of the commercial object in the screenshot image corresponding to the commercial item information to be displayed.

Figure 16F:
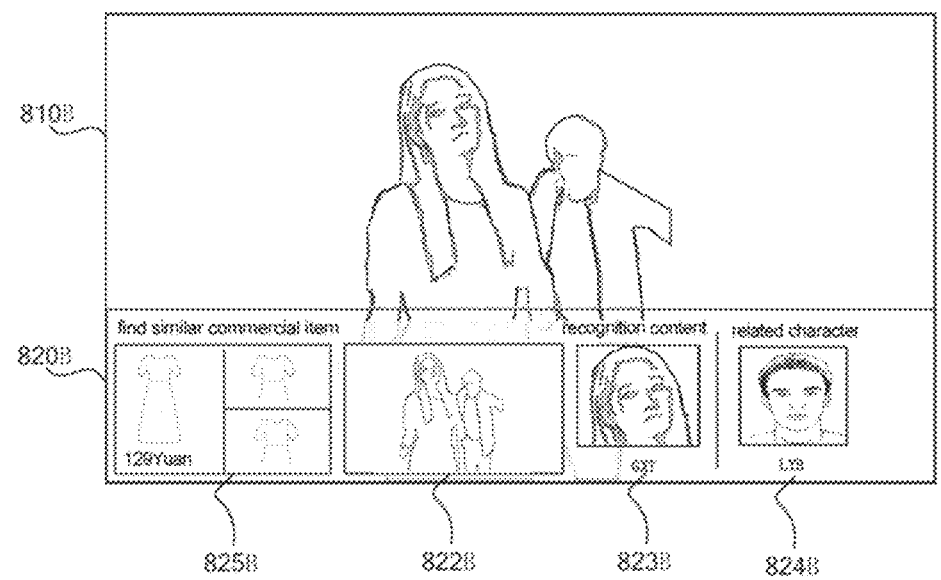

FIG. 16f is a schematic diagram of a user interface shown in some embodiments of the present disclosure. As shown in FIG. 16f, the difference from as shown in FIG. 16a to FIG. 16e, lies in the area for displaying the recognition content, the recognized commercial item information is not directly displayed, but a control 825B for display a commercial item is displayed. The user can trigger display of commercial item information by operating the control for displaying one or more commercial items. Specifically, when receiving a confirmation operation for the control or bar for displaying a commercial item, the display apparatus displays the commercial item information that matches with the commercial object in the screenshot image.

It should be noted that, in response to a confirmation operation for a bar for displaying a commercial item, the commercial item information detail page as shown in FIG.

16e can be displayed; or the option bar loaded with the commercial item information, such as the option bar 821B shown in FIG. 16a to FIG. 16d, can still be displayed in the area for displaying the recognition content shown in FIG. 16a to FIG. 16d.

In some embodiments, if the screenshot image contains both a commercial object and a character object, upon receiving a command for capturing a screenshot from the user, commercial item information that matches with both the commercial object and the character object is displayed. Specifically, the commercial item information may be information of a commercial item that matches with both an image feature of the commercial object and a name of the character object. The name of the character object is obtained by recognizing a face region of the character object in the screenshot image.

In some embodiments, the name of the character object includes a real name of the character that is obtained by recognizing the face region of the character object, such as a name of an actor, and a name of a role played by the actor in video content. Certainly, the name of the character object may also be a name of a role played by the actor in another film and television drama.

In some embodiments, the commercial item information includes a title of the commercial item information, and commercial item information that matches with both the names of the commercial object and the character object. The title of the commercial item information includes the name of the character object.

Figure 17A:
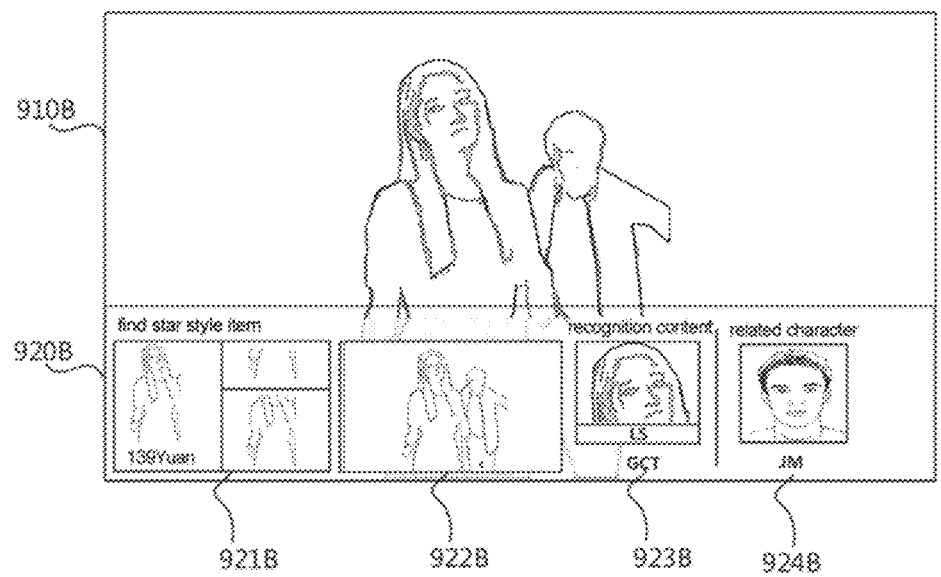
FIG. 17a to FIG. 17j show a user interface according to some embodiments of the present disclosure.

For example, when video content currently played by the display apparatus is a variety show or a film and television program, commercial item information matching with both a commercial item and an actor or a role that appear in a screenshot, that is, information about a same commercial item of the actor or the role in the program, is presented. FIG. 17a is a schematic diagram of a user interface shown in some embodiments of the present disclosure. The user interface is specifically a user interface displayed after a command for capturing a screenshot is received when the image shown in FIG. 15a is displayed. As shown in FIG. 17a, the user interface includes an area 910B for displaying current content and an area 920B for displaying recognition content. An image of current play content, that is, a television drama "Er Shi Bu Huo" is displayed in the area 910B for displaying the current content, and a control for displaying a commercial item and a plurality of option bars are displayed in the area 920B for displaying the recognition content. A target commercial item picture and a commercial item price mark are displayed in a commercial item display control 921B. The target commercial item picture may be a commercial item picture included in commercial item information that matches with both the character object A and the commercial object a in the screenshot, and a commercial item price mark "139 Yuan" is displayed on an upper layer of the target commercial item picture. The thumbnail of the screenshot image is displayed in an option bar 922B. A screenshot area of the character object A in the screenshot, a character name "GXT" that matches with the character object A, a name "LS" of a role played by "GXT" in the currently played television drama "Er Shi Bu Huo", and related character information "JM" are displayed in a character-information option bar 923B.

When a user interface as shown in FIG. 17a is displayed by the display apparatus, the user can view specific commercial item information by operating the commercial item display control 921B. In some embodiments, in response to receiving a confirmation operation for the commercial item display bar, commercial item information that matches with both the name of the character object and the commercial object is displayed.

In some embodiments, an option bar loaded with the commercial item information can be displayed in the area for displaying the recognition content. In the area for displaying the recognition content, the thumbnail of the screenshot image and/or the character recognition result shown in FIG. 17a may be displayed, or the thumbnail of the screenshot image and/or the character recognition result shown in FIG. 17a may not be displayed.

Figure 17B:
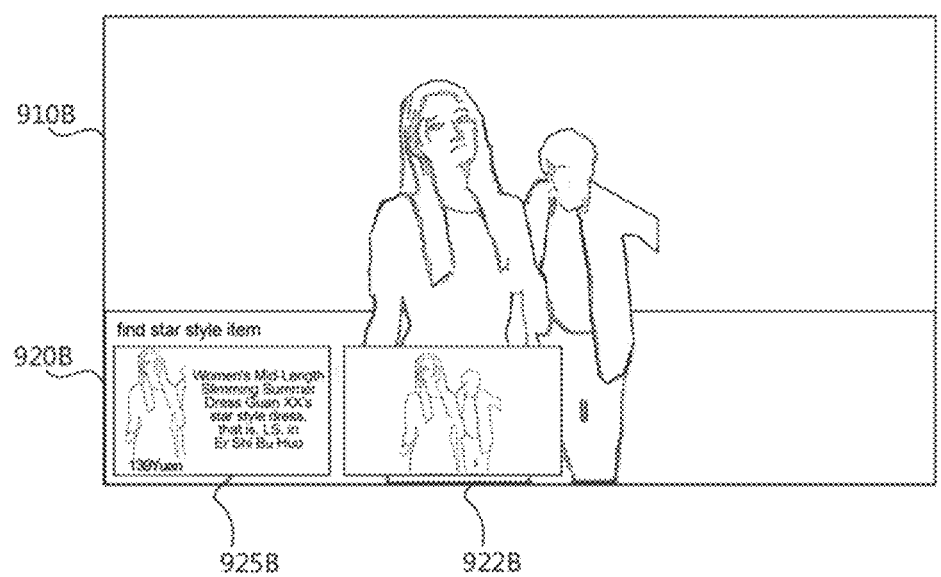

FIG. 17b is a schematic diagram of a user interface shown in some embodiments of the present disclosure. The user interface is specifically a user interface displayed after a confirmation operation for the commercial item display control 921B is received when the user interface is as shown in FIG. 17a. As shown in FIG. 17b, the option bar 922B loaded with the thumbnail of the screenshot image and an option bar 925B loaded with the commercial item information are displayed in the area for displaying the recognition content. The loaded commercial item information includes: a commercial item picture, a title of the commercial item information, and a commercial item price, where the title of the commercial item information "Women's Mid-Length Slimming Summer Dress Guan XX's star style dress, that is, LS, in Er Shi Bu Huo" includes a name "GXT" of an actor corresponding to the character object A and a role name "LS".

In some embodiments, by operating the option bar where the thumbnail of the screenshot image is located, the user can view an original image file of the screenshot image, and input operations for sharing and downloading the screenshot image.

It should be noted that, a layout of the option bar for displaying the commercial item recognition result, the option bar for displaying the screenshot thumbnail, and the option bar for displaying the character recognition result in the user interface may not be limited to the layouts shown in the examples provided in the specification of the present disclosure, and may also be another layout.

In some embodiments, it may be that only the commercial item information that matches with both the name of the character object and the commercial object is displayed, as shown in FIG. 17b. In these embodiments, if the display apparatus obtains the commercial item information that matches with both the name of the character object and the commercial object from a server side, the obtained commercial item information is displayed. If the display apparatus does not obtain the commercial item information that matches with both the name of the character object and the commercial object from the server side, the obtained commercial item information is not displayed, or a prompt for indicating no recognition result is displayed.

In some other embodiments, the display apparatus preferentially displays the commercial item information that matches with both the name of the character object and the commercial object. In these embodiments, if the display apparatus can obtain the commercial item information that matches with both the name of the character object and the commercial object from the server side, the commercial item information that matches with both the name of the character object and the commercial object is displayed. If the display apparatus does not obtain the commercial item information that matches with both the name of the character object and the commercial object from the server side, commercial item information that merely matches with the commercial object is displayed.

Figure 17C:
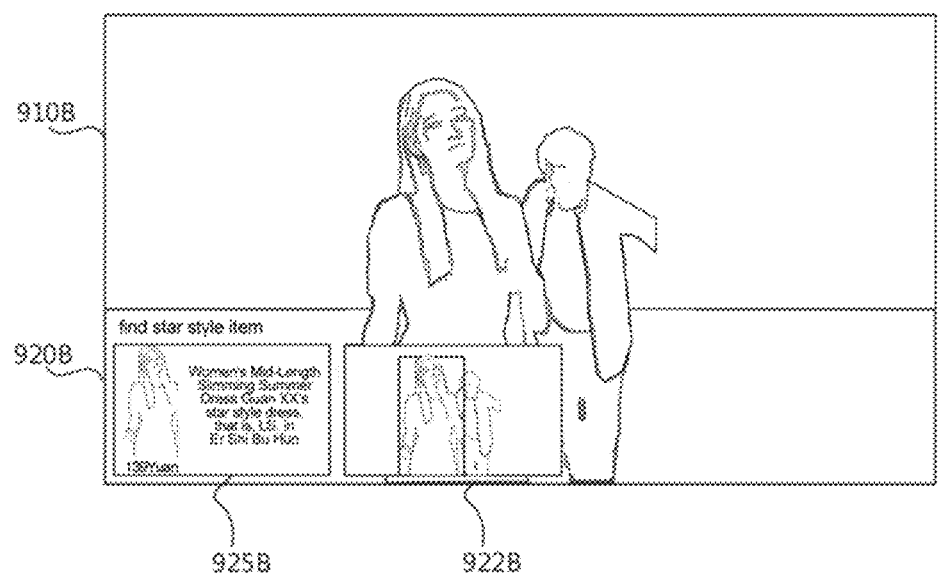

FIG. 17c shows a user interface shown in some embodiments of the present disclosure. The user interface is specifically a user interface displayed after a confirmation operation for the commercial item display control 921B is received when the image shown in FIG. 17a is displayed. A difference is that in FIG. 17 c, the focus frame for recognized object is also displayed on the displayed screenshot thumbnail, for identifying the character object and/or the commercial object corresponding to the option bar where the focus frame for content selection is located, or identifying the commercial object corresponding to the currently displayed commercial item information.

Figure 17D:
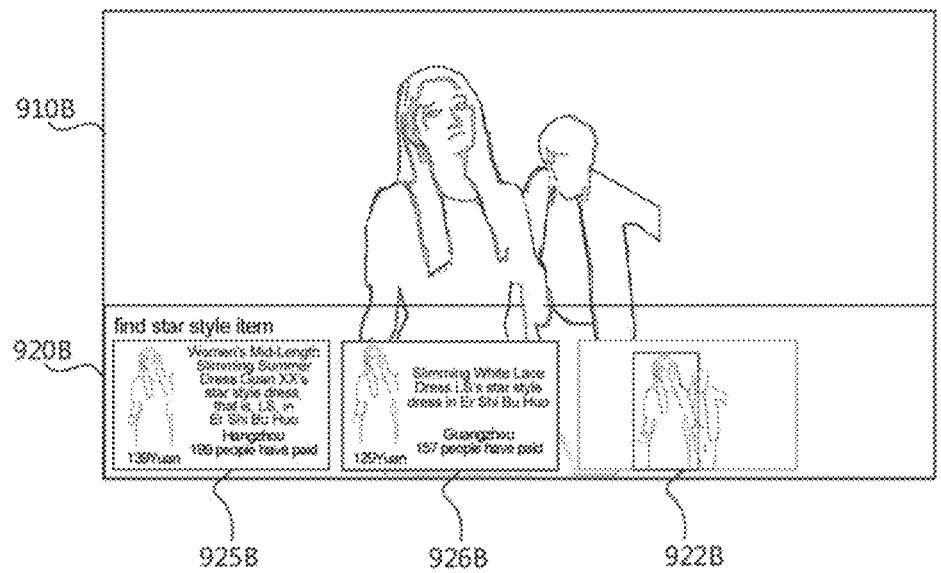

FIG. 17d shows a user interface shown in some embodiments of the present disclosure. The user interface is specifically a user interface displayed after a confirmation operation for the commercial item display control 921B is received when the image shown in FIG. 17a is displayed. Different from the user interface shown in FIG. 17b, in FIG. 17d, a plurality pieces of commercial item information that are from different sources and match with both the character object and the commercial object in the screenshot are displayed in the area for displaying the recognition content at the same time. commercial item information from a first source is displayed in the commercial-information option bar 925B, including: a commercial item picture, a price "139 Yuan", a commercial item title "Women's Mid-Length Slimming Summer Dress Guan XX's star style dress, that is, LS, in Er Shi Bu Huo", a place of shipment "Hangzhou", and a sales data "199 people have paid". Commercial item information from a second source is displayed in a commercial-information option bar 926B, including: a commercial item picture, a price "129 Yuan", a commercial item title "Slimming White Lace Dress Same to That of LS in Er Shi Bu Huo", a place of shipment "Guangzhou", and a sales volume "157 people have paid". It should be noted that the commercial item information from different sources may be commercial item information released by different shops/sellers, or may be commercial item information published on different network platforms, or may be commercial item information including different prices, qualities, and place of shipments.

In some embodiments, option bars corresponding to the foregoing plurality pieces of commercial item information from different sources may be displayed in an order of sales, transportation distances, prices, or similarity with the corresponding commercial objects.

In some embodiments, the similarity between the commercials corresponding to the commercial item information from different sources and the commercial objects in the screenshot image need to meet a predetermined similarity condition. In some embodiments, if there are multiple groups of associated commercial objects and character objects in the screenshot image, multiple pieces of commercial item information that respectively match with both the multiple groups of different commercial objects and character objects can be displayed. The associated character object and commercial object can be a certain character object and a commercial object worn by the character object. For example, in FIG. 15a, the character object A is associated with the commercial object a worn by the character object A, and the character object B is associated with the commercial object b worn by the character object B.

Figure 17E:
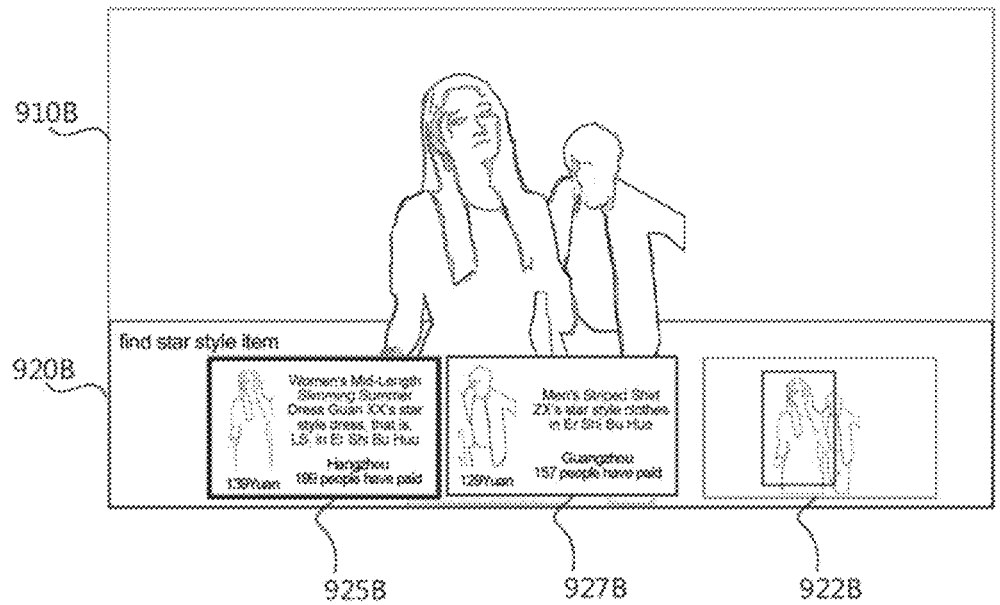

FIG. 17e shows a user interface shown in some embodiments of the present disclosure, which is specifically a user interface displayed after a confirmation operation for the commercial item display control 921B is received when the image shown in FIG. 17a is displayed. A difference is that, in FIG. 17e, a commercial-information option bar 927B is also displayed. Commercial item information that matches with both the character object B and the commercial object b is displayed in the commercial-information option bar 927B. The commercial item information is specifically a commercial item picture, a price "129 Yuan", a title of the commercial item information "Men's Striped Shirt ZX's star style clothes in Er Shi Bu Huo", a place of shipment "Guangzhou", and sales data "157 people have paid".

In some embodiments, when the focus frame for content selection falls on the commercial-information option bar, the focus frame for recognized object is displayed on the screenshot thumbnail. Moreover, the focus frame for recognized object is displayed around an area of the commercial object corresponding to the option bar where the focus frame for content selection is located. For example, in the user interface shown in FIG. 17e, the focus frame for content selection falls on the commercial-information option bar 925B, and the focus frame for recognized object is displayed on the commercial object b. It should be understood that when the focus frame for content selection is moved to the commercial-information option bar 925B, the focus frame for recognized object is moved to the commercial object b.

In some embodiments, when there is a plurality of character objects in the screenshot image, commercial item information of a second commercial item is preferentially displayed. The commercial item information of the second commercial item matches with both a name of a second character object in the screenshot image and the second commercial object. A reference character in a database that matches with face information of the second character object is a second reference character. It should be noted that similarity between the second character object and the second reference character is higher than similarity between another character object and the corresponding reference character. For example, taking the screenshot image shown in FIG. 15 as an example, there are two character objects in the screenshot image, which are A and B; and there are also two commercial objects, which are a "dress" worn by the character object A, that is, the commercial object a, and a "shirt" worn by the character object B, that is, the commercial object b. Assuming that the face information of the character object A matches with the face information of "GXT" in the database with similarity of 90%, and the face information of the character object B matches with the face information of "JM" in the database with similarity of 85%, the commercial item information that matches with both the name of the character object A and the commercial object a is displayed preferentially.

Figure 17F:
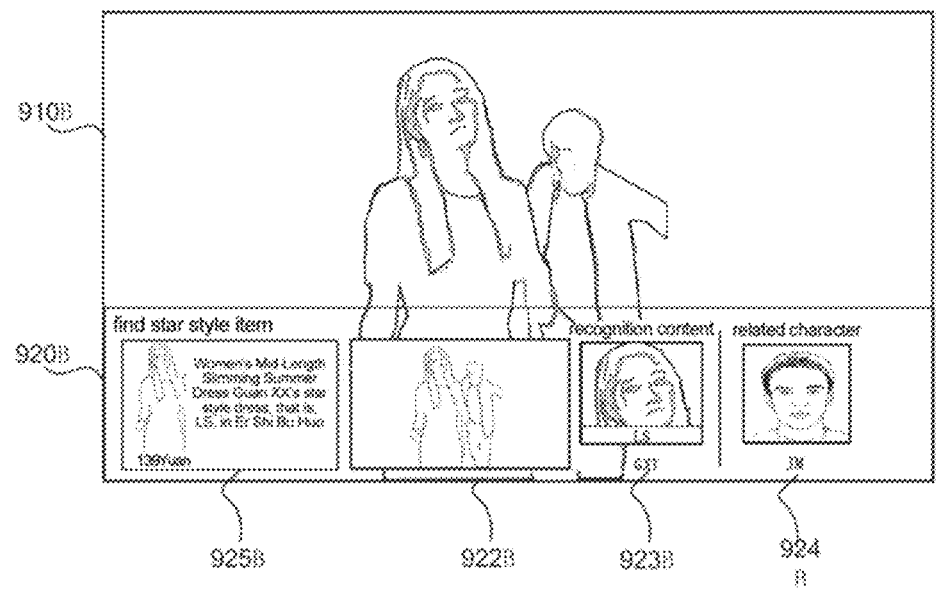

FIG. 17f shows a user interface shown in some embodiments of the present disclosure. The user interface is specifically a user interface displayed after a confirmation operation for the commercial item display control 921B is received when the image shown in FIG. 17a is displayed. A difference is that, in the user interface shown in FIG. 17f, not only a commercial-information option bar and an option bar for displaying the screenshot thumbnail, but also a character-information option bar is displayed in the area for displaying the recognition content.

In some embodiments, a control for displaying commercial item information under a specified category is set in the area for displaying the recognition content, and the user browses the commercial item information under the corresponding category of the selected control by selecting a corresponding control. For example, a first control and a second control are displayed in the area for displaying the recognition content. When the first control is selected by the user, one or more pieces of commercial item information that match with both the character object A and the commercial object a in the screenshot, that is, information about a same commercial item of the character object A, are displayed in the area for displaying the recognition content. When the second control is selected by the user, one or more pieces of commercial item information that match with both the character object B and the commercial object b in the screenshot, that is, information about a same commercial item of the character object B, are displayed in the area for displaying the recognition content.

Figure 17G:
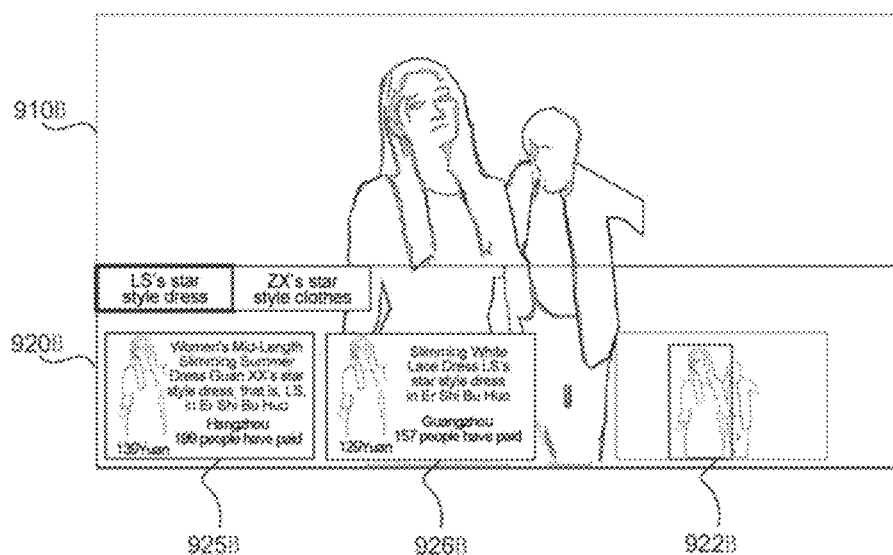
Figure 17H:
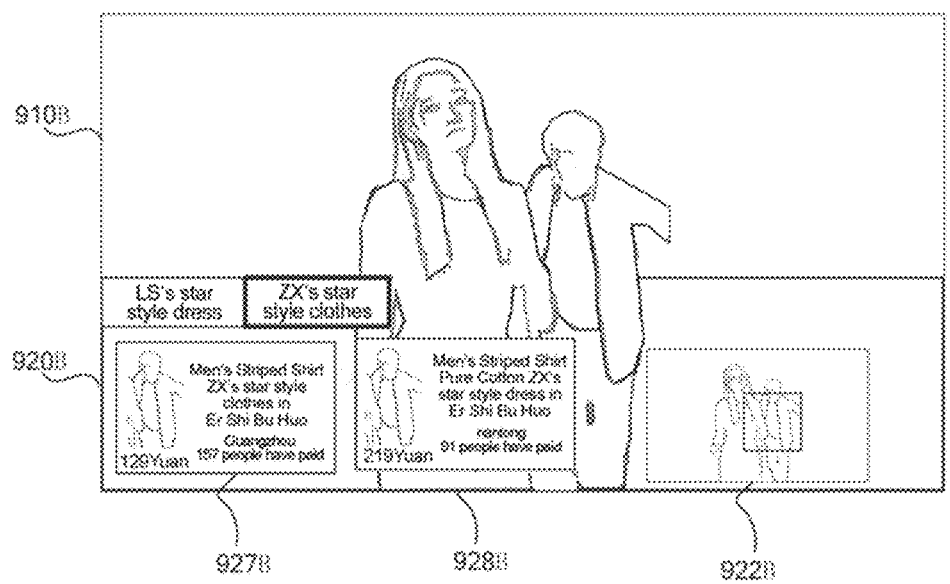

FIG. 17g shows a user interface shown in some embodiments of the present disclosure. The user interface is specifically a user interface displayed after a confirmation operation for the commercial item display control 921B is received when the image shown in FIG. 17a is displayed. In the user interface shown in FIG. 17g, a first control "same as LS" and a second control "same as ZX" are displayed in the area 920B for displaying the recognition content. The first control "same as LS" is used to display commercial item information matching with the character object A, and the second control "same as ZX" is used to display commercial item information matching with the character object B. In this way, the user can view information about commercial items of different character objects by operating different controls. For example, in FIG. 17g, if the first control "same as LS" is selected by the user, one or more pieces of commercial item information that match with both the character object A and the commercial object a are displayed in the area for displaying the recognition content. In this case, the focus frame for recognized object is displayed in an area corresponding to the commercial object a. In FIG. 17h, if a second control 928B "same as ZX" is selected by the user, one or more pieces of commercial item information that match with the commercial object b are displayed in the area for displaying the recognition content. In this case, the focus frame for indicating recognized object is displayed in an area corresponding to the character object B and the commercial object b.

In some embodiments, in search and display scenarios, a role name and an actor name can be set to replace with each other.

Figure 17I:
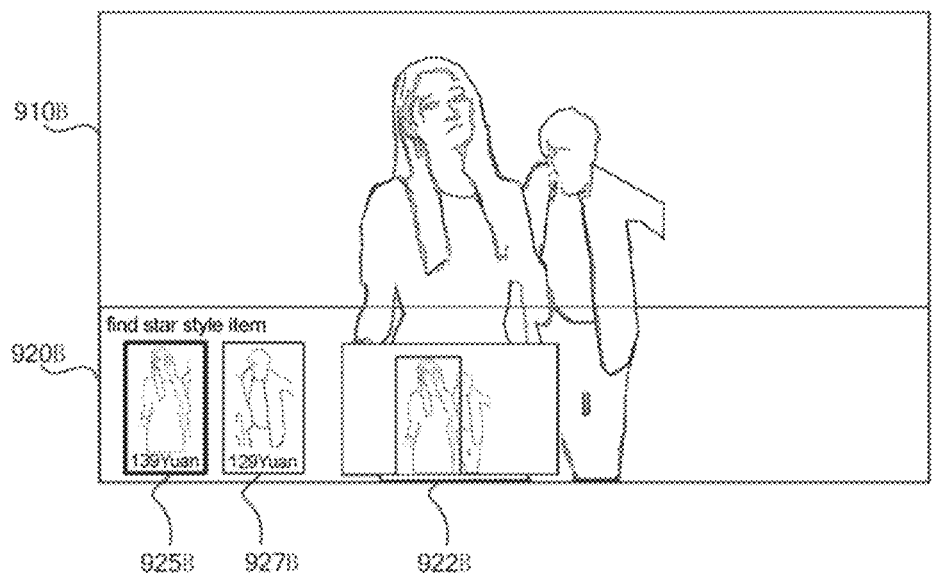

FIG. 17i shows a user interface shown in some embodiments of the present disclosure. The user interface is specifically a user interface displayed after a confirmation operation for the commercial item display control 921B is received when the image shown in FIG. 17a is displayed. A difference is that, in the user interface shown in FIG. 17i, only the picture and the price of the commercial item are displayed in the merchandise-information option bar, but the title of the commercial item information is not displayed, and information such as a source of the commercial item is also not displayed.

Figure 17J:
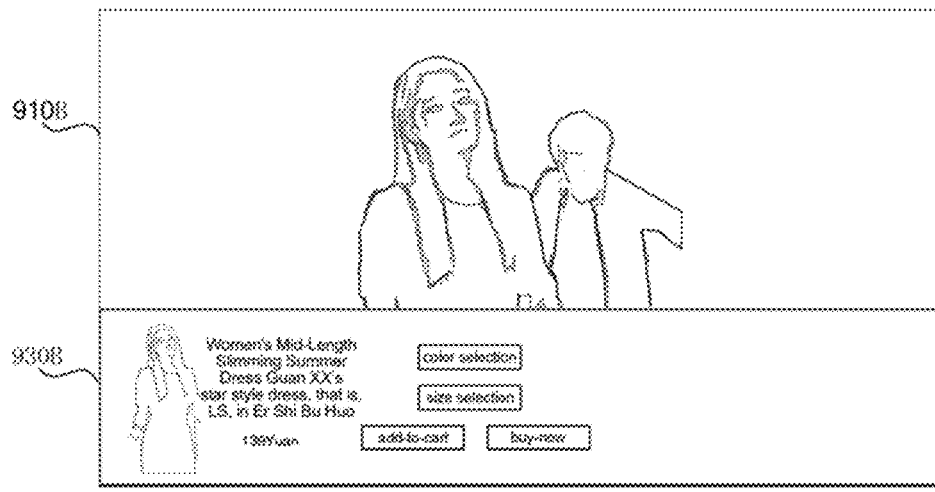

FIG. 17j is a schematic diagram of a user interface shown in some embodiments of the present disclosure. The user interface is specifically a user interface displayed after an operation of the merchandise-information option bar 925B is received. As shown in FIG. 17j, a commercial item information detail page 930B is displayed on an upper layer of a current play image. The commercial item information detail page 930B displays a commercial item picture, a title of the commercial item information "Women's Mid-Length Slimming Summer Dress Guan XX's star style dress, that is, LS, in Er Shi Bu Huo", a commercial item price "139 Yuan", a color selection control, a size selection control, an add-to-cart control, and a buy-now control.

In some embodiments, the present disclosure further provides a method for recognizing an image, which is applied to a display apparatus. The method includes some or all of the steps implemented by the display apparatus described in the embodiments of the present disclosure.

In a scenario of recognizing a commercial object in the image, an image feature is first extracted, and then the extracted image feature is matched with a global feature library, so as to obtain commercial item information matching with the feature of the commercial object in the image. The global feature library includes features of a lot of types of commercial items. These commercial items herein may refer to items described by commercial item information on a shopping website, or may be a collection of commercial item information on shopping websites. It should be understood that, matching the extracted image feature with the global feature library comprising matching the extracted image feature with the feature of each item, so as to obtain commercial item information of a commercial item that matches with the image feature best.

In actual application, due to factors such as a picture size and resolution, when the image feature is not sufficiently extracted, an accuracy rate of commercial item recognition may be lower, or the recognized commercial item has lower similarity to the commercial object in the image, or there is no recognition result. In addition, image recognition is performed based on the global feature library, that is, the extracted image feature is matched with the feature of each commercial item. Therefore, an error rate in feature recognition is relatively high with a large calculation workload and long processing time. As a result, a commercial item recognition result displayed in a user interface, that is, commercial item information recognized based on a screenshot image, is quite different from a commercial object in the screenshot image, thereby the user experience gets worse.

Figure 18:
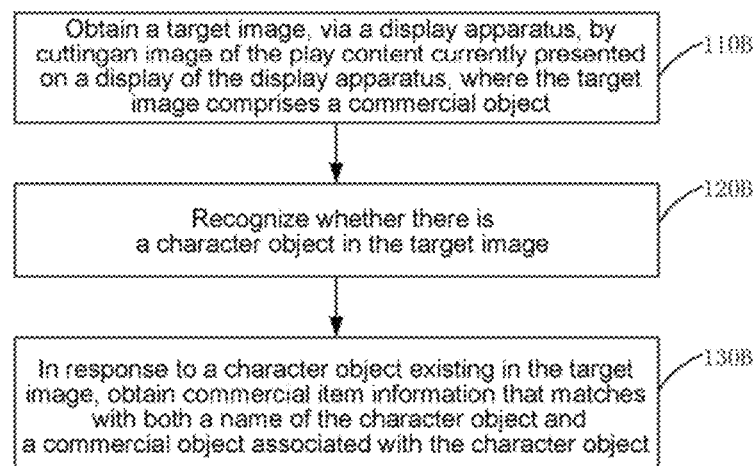
FIG. 18 is a flowchart of a method for recognizing an image according to some embodiments of the present disclosure.

In view of the above, the present disclosure provides a method for recognizing an image. FIG. 18 is a flowchart of a method for recognizing an image according to an exemplary embodiment of the present disclosure. As shown in FIG. 18, the method can include the following steps.

Step 110B. Obtain a target image, via a display apparatus, by cutting an image of the play content currently presented on a display of the display apparatus, where the target image comprises a commercial object.

In some embodiments, the target image may be a display image on the display, that is, a screenshot image, cut by the display apparatus in response to a command for capturing a screenshot.

For example, when a video is played in full screen on the display, screenshot capture and recognition of a commercial object in the screenshot image can be triggered in various ways such as buttons of a remote control, soft buttons on a touch screen, voice commands, and gestures. The display apparatus performs screenshot capturing on an image of currently displayed content on the display, to obtain the screenshot image.

In some embodiments, after obtaining the screenshot image, the display apparatus sends the screenshot image to a server, so that the server completes recognition of the commercial object in the screenshot, and returns recognized commercial item information to the display apparatus.

In some other embodiments, after obtaining the screenshot image, the display apparatus sends the screenshot image and information about the play content to the server, so that the server completes recognition of the commercial object in the screenshot based on the information about the play content, and returns recognized commercial item information to the display apparatus. The information about the play content includes a type of the play content, a name of a media resource, and the like. The type of the play content includes movies, television dramas, variety shows, news, or the like.

Step 120B. Recognize whether there is a character object in the target image.

In some embodiments, before recognizing whether there is a character object in the target image, the method further includes: determining whether the play content is of a predetermined type; and if the play content is of the predetermined type, implementing the step of recognizing whether there is a character object in the target image.

In some embodiments, whether a type of the current play content is a predetermined type is determined by the display apparatus. When it is determined that the current play content is of the predetermined type, the screenshot image and a name of a media resource of the play content are sent to the server, so that the server recognizes the commercial object in the screenshot image based on the screenshot image and the name of the media resource of the play content. The play content of the predetermined type includes play content from which information about actors can be found. The predetermined types comprise a television drama, a movie, and some variety shows.

In some other embodiments, the display apparatus does not determine the type of the current play content, but sends the screenshot image and the information about the play content to the server, so that the server determines whether the play content is of the predetermined type based on the information about the play content sent from the display apparatus.

Step 130B. in response to a character object existing in the target image, obtain commercial item information that matches with both a name of the character object and a commercial object associated with the character object.

In some embodiments, by recognizing the character object in the screenshot image, the name of the person character is obtained, and the name of the character object is used to narrow feature match items of the commercial object in the recognizing screenshot since the commercial object in the screenshot is often general and does not point to a specific style. If the name of the character object is added in filtering which commercial items matches the commercial object, the search efficiency and accuracy for the commercial recognition will be improved.

In some embodiments, the name of the character object includes a name of an actor and/or a name of a role corresponding to the play content. The name of the actor is generally a real name of the actor. The name of the role corresponding to the play content can be a name of a role played by the actor in the play content. For the play content of a type of a movie or a television drama, if there is a character object in the screenshot image, a name of an actor of the character object, that is, a real name of the actor, can be recognized through image recognition. Further, a cast list of the play content can be found based on the name of the media resource of the play content, such as a title of the television drama or a title of the movie, so as to obtain the name of the role in the play content, that is, the name of the role played by the actor in the play content. It can be understood that the name of the character object includes, but is not limited to, the name of the actor that matches with the character object and/or the name of the role corresponding to the play content. For example, the name of the character object can also include content profile, a content source, and the like that are related to the actor; and can also include content profile, a source, and the like that are related to the role; and can also include recommendation information related to the actor and/or the role, such as a name of another role played by the actor and a name of another actor who plays the role.

In the related art, an image feature is first extracted, and then the extracted image feature is compared with a global feature library, so as to obtain commercial item information matching with the feature of the commercial object in the image. Matching the extracted image feature with the global feature library comprising comparing the extracted image feature with the feature of each commercial item, where a calculation amount is large and an error rate is high. Therefore, this is not good for accurate recognition of the commercial object.

Moreover, in the embodiments of the present disclosure, if the play content is of a predetermined type, and there is a character object in the screenshot image, the character object is first recognized to obtain a name of the character object, and then the name of the character object is used as a keyword for retrieving related information, so as to search all commercial item information for commercial item information matching with the character object, such as commercial item information including the name of the character object. The global feature library includes the feature information of a lot of types of commercial items. Therefore, the feature information of the commercial item information matching with the character object can be obtained from the global feature library. The feature information of the commercial item information matching with the character object constructs a local feature library. Finally, the image feature of the screenshot is matched with the local feature library, that is, a commercial item matching with the commercial object in the screenshot best is obtained from the commercial item information that match with the character object stored in the local feature library, so as to obtain the commercial item information that matches with both the character object and the commercial object.

In the foregoing embodiments, when the play content is of the predetermined type and there is a character object in the screenshot, through image recognition, the commercial item information that matches with both the character object and the commercial object is displayed to the user. In this way, requirements of the user for searching for a same commercial item and/or a similar commercial item of the character in the play can be satisfied, thereby improving user experience. Moreover, the commercial object in the screenshot is recognized based on the local feature library, and an amount of feature information in the local feature library is far less than that in the global feature library. Therefore, the calculation amount of commercial item feature matching is greatly reduced, a probability of matching errors is reduced, and accuracy of the recognition result is improved. In addition, because feature information of other merchandises irrelevant to the character object has been eliminated before the commercial item feature matching, the possibility of providing the user with a same commercial item of the character is further improved.

For example, if a command for triggering screenshot capturing and image recognition is received when the image shown in FIG. 15a is played, in response to the command, the display apparatus performs screenshot capture to obtain a screenshot image shown in FIG. 15a, and meanwhile obtain information about the play content, such as field information for indicating that a play type is "television drama" and the name of the media resource is "Er Shi Bu Huo"; and sends the screenshot image and the information about the play content to the server.

The server receives the screenshot image and the information about the play content. First, it is determined that the screenshot image is an image from the "television drama" "Er Shi Bu Huo" based on the information about the play content. Because "television drama" belongs to the predetermined type, the step of determining whether there is a character object in the screenshot image is performed. For example, the server can process the screenshot image through a preconfigured face recognition model, to determine whether there is a character object in the screenshot image and recognize that an actor keyword matching with the character object is "GXT"; and can also determine that a role played by "GXT" is "LS" based a cast list of "Er Shi Bu Huo". Subsequently, the database including many types of commercial item information is searched by using "Er Shi Bu Huo", "GXT", and/or "LS" as keywords for retrieving related information, to obtain commercial item information matching with "LS" and/or "GXT", that is, commercial item information with "LS" and/or "GXT" in a commercial item title. Subsequently, the feature information corresponding to the commercial item information with "LS" and/or "GXT" in a commercial item title is extracted from the global feature library, to construct the local feature library. Finally, the image feature of the screenshots is extracted, and the extracted image feature is compared with the local feature library to obtain the commercial item information matching with the commercial object in the screenshot, such as a commercial item buying link titled "Same Dress of GXT, that is, LS, in Er Shi Bu Huo . . . " shown in FIG. 17a.

In some embodiments, if the play content is not of the predetermined type, or there is no character object in the screenshot image, or the character object in the screenshot image cannot be recognized, or the commercial item information matching with the character object cannot be searched according to the name of the character object, the commercial object in the screenshot image is recognized based on the global feature library, so as to obtain the screenshot image that merely matches with the commercial object.

According to the present disclosure, when the play content is of the predetermined type and there is a character object in the screenshot, through image recognition, the commercial item information that matches with both the character object and the commercial object is displayed to the user. In this way, requirements of the user for searching for a same commercial item and/or a similar commercial item of the character in the play can be satisfied, thereby the user experience is improved. Moreover, the commercial object in the screenshot is recognized based on the local feature library, and the amount of feature information in the local feature library is far less than that in the global feature library. Therefore, the calculation amount of feature matching for the commercial object is greatly reduced, the probability of matching errors is reduced, and accuracy of the recognition result is improved. In addition, because feature information of other commercial items irrelevant to the character object has been eliminated before the feature matching, accuracy of providing the user with a same commercial item of the character is further improved.

For ease of explanation, the foregoing descriptions are provided in combination with specific embodiments. However, the foregoing exemplary discussions are not intended to limit the embodiments to the specific forms disclosed above. Various modifications and variations can be obtained according to the foregoing teachings. Selections and description of the foregoing embodiments are intended to better explain the principles and practical applications, so that a person skilled in the art can better use the embodiments and implementations of various different variations suitable for specific use.

What is claimed is:

1. A display apparatus, comprising:
   a display configured to display a video;
   a user input interface; and
   a controller in connection with the display and the user input interface, the controller being configured to:
      receive a command via the user input interface for obtaining information associated with one or more character objects in the video currently displayed on the display of the display apparatus, wherein the video is displayed in a video play window in the video layer;
      in response to the command, obtain a target image in the video play window, to recognize an object in the target image; and
      continue playing the video in the video play window in the video layer, and display a character name of a character object recognized from the target image in a first layer over the video layer,
   wherein the controller is further configured to:
      in response to a similarity between a first preset image corresponding to a first character name and a first character object in the target image meets a first predetermined range, display the first character name without displaying a similarity indication information, wherein the first preset image is an image in a database for character search, and the first character name is a name of the first character object; and
      in response to a similarity between a second preset image corresponding to a second character name and a second character object in the target image meets a second predetermined range lower than the first predetermined range, place the similarity indication information before the second character name, wherein the second preset image is an image in the database for character search, and the second character name is a name of the second character object.

2. The display apparatus according to claim 1, wherein the first layer is configured with an option bar for displaying a recognition result, the recognition result comprising:
   the first character name, without displaying the similarity indication information corresponding to the first character object in a layer over the option bar, and
   the second character name, with the similarity indication information corresponding to the second character object displayed in a layer over the option bar.

3. The display apparatus according to claim 1, wherein the controller is further configured to:
   display one or more option bars in the first layer, wherein the one or more option bars are configured to present one or more character names of the one or more character objects, one option bar corresponds to one character name; the one or more character names include the first character name and the second character name;
   the one or more option bars include a first option bar and a second option bar; the first character name is displayed in the first option bar, without displaying the similarity indication information corresponding to the first character object; and the similarity indication information corresponding to the second character object is displayed before the second character name in the second option bar.

4. The display apparatus according to claim 3, wherein the first option bar without the similarity indication information is presented before the second option bar with the similarity indication information before the second character name.

5. The display apparatus according to claim 3, wherein the controller is further configured to:
  display a thumbnail of the target image, wherein the one or more option bars are presented on one side of the thumbnail according to a degree of similarity between a preset image of a corresponding character name and a corresponding character object in the target image.

6. The display apparatus according to claim 5, wherein the controller is further configured to:
  highlight a third character object in the thumbnail, wherein a focus frame falls on a third option bar corresponding to a name of the third character object.

7. The display apparatus according to claim 1, wherein the controller is further configured to:
  recognize a commercial item corresponding to the character object; and
  display commercial item information corresponding to the commercial item recognized from the target image in the first layer.

8. The display apparatus according to claim 7, wherein the controller is further configured to:
  provide an option bar for presenting the commercial item information on the first layer, and
  in response to a selection of the option bar for presenting the commercial item information, display detailed commercial item information and a buying webpage linking to a shopping website.

9. The display apparatus according to claim 8, wherein the controller is further configured to:
  after the object in the target image and the character name of the character object are recognized, obtain the commercial item information corresponding to the character name from a server and construct a local database in the display apparatus based on the commercial item information from the server, and determine one or more commercial items corresponding to the character object in the target image from the local database, wherein the character name comprises a name of an actor corresponding to the character object and a role name of the character object.

10. A method for displaying an image recognition result on a display apparatus, comprising:
  receiving a command, via a user input interface of the display apparatus, for obtaining information associated with one or more character objects in a video currently displayed on a display of the display apparatus, wherein the video is displayed in a video play window in a video layer;
  in response to the command, obtaining a target image in the video play window, to recognize an object in the target image; and
  continuing playing the video in the video play window in the video layer, and displaying a character name of a character object recognized from the target image in a first layer over the video layer, wherein the method further comprises:
  in response to a similarity between a first preset image corresponding to a first character name and a first character object in the target image meets a first predetermined range, displaying the first character name without displaying a similarity indication information, wherein the first preset image is an image in a database for character search, and the first character name is a name of the first character object; and
  in response to a similarity between a second preset image corresponding to a second character name and a second character object meets a second predetermined range lower than the first predetermined range, placing the similarity indication information before the second character name, wherein the second preset image is an image in the database for character search, and the second character name is a name of the second character object.

11. The method according to claim 10, wherein the first layer is configured with an option bar for displaying a recognition result, the recognition result comprising:
  the first character name, without displaying the similarity indication information corresponding to the first character object in a layer over the option bar, and
  the second character name, with the similarity indication information corresponding to the second character object displayed in a layer over the option bar.

12. The method according to claim 10, further comprising:
  displaying one or more option bars in the first layer, wherein the one or more option bars are configured to present one or more character names of the one or more character objects, one option bar corresponds to one character name, the one or more character names include the first character name and the second character name, the one or more option bars include a first option bar and a second option bar, the first character name is displayed in the first option bar,
  without displaying the similarity indication information corresponding to the first character object, and the similarity indication information corresponding to the second character object is displayed before the second character name in the second option bar.

13. The method according to claim 12, wherein the first option bar without the similarity indication information is presented before the second option bar with the similarity indication information before the second character name.

14. The method according to claim 12, further comprising:
  displaying a thumbnail of the target image, wherein the one or more option bars are presented on one side of the thumbnail according to a degree of similarity between a preset image of a corresponding character name and a corresponding character object in the target image.

15. The method according to claim 14, further comprising:
  highlighting a third character object in the thumbnail, wherein a focus frame falls on a third option bar corresponding to a name of the third character object.

16. The method according to claim 10, further comprising:
  recognizing a commercial item corresponding to the character object; and
  displaying commercial item information corresponding to the commercial item recognized from the target image in the first layer.

17. The method according to claim 16, further comprising:
  providing an option bar for presenting the commercial item information on the first layer, and
  displaying, in response to a selection of the option bar for presenting the commercial item information, detailed commercial item information and a buying webpage linking to a shopping website.

18. The method according to claim 17, further comprising:

obtaining, after the object in the target image and the character name of the character object are recognized, the commercial item information corresponding to the character name from a server and constructing a local database in the display apparatus based on the commercial item information from the server, and determining one or more commercial items corresponding to the character object in the target image from the local database, wherein the character name comprises a name of an actor corresponding to the character object and a role name of the character object.

* * * * *